United States Patent [19]

Kobayashi et al.

[11] Patent Number: 5,243,842

[45] Date of Patent: Sep. 14, 1993

[54] METHOD OF MAKING A BRAZEABLE METAL PIPE HAVING TUBE-INSERTION APERTURES FORMED WITH GUIDE LUGS

[75] Inventors: Hideyuki Kobayashi, Soukashi; Mitsuru Nobusue, Oyamashi; Noboru Kodachi, Oyamashi; Tustomu Motohashi, Oyamashi; Hironaka Sasaki, Oyamashi; Ryoichi Hoshino, Oyamashi; Koji Tomita, Ohiramachi; Haruo Fujinuma, Tochigishi, all of Japan

[73] Assignee: Showa Aluminum Kabushiki Kaisha, Sakaishi, Japan

[21] Appl. No.: 915,081

[22] Filed: Jul. 16, 1992

Related U.S. Application Data

[63] Continuation of Ser. No. 785,949, Oct. 31, 1991, abandoned, which is a continuation of Ser. No. 351,778, May 15, 1989, abandoned.

[30] Foreign Application Priority Data

Jul. 14, 1988 [JP] Japan .................................. 63-93173
Jun. 30, 1992 [JP] Japan .................................. 4-172089
Jun. 30, 1992 [JP] Japan .................................. 4-172094

[51] Int. Cl.$^5$ .............................................. B21D 53/02
[52] U.S. Cl. ...................... 72/51; 29/890.053; 29/890.052; 72/335
[58] Field of Search ............... 29/890.043, 890.046, 29/890.053, 090.054, 890.052; 72/51, 335, 336, 337, 338; 228/183, 171, 173.6; 165/173

[56] References Cited

U.S. PATENT DOCUMENTS

| | | | |
|---|---|---|---|
| 4,615,385 | 10/1986 | Saperstein et al. | 165/173 |
| 4,945,635 | 8/1990 | Nobusue et al. | 29/890.043 |
| 5,082,051 | 1/1992 | Ando | 29/890.052 |
| 5,088,193 | 2/1992 | Okada et al. | 29/890.043 |
| 5,119,552 | 6/1992 | Sutou et al. | 29/890.053 |
| 5,172,762 | 12/1992 | Shinmura et al. | 29/890.043 |

FOREIGN PATENT DOCUMENTS

| | | | |
|---|---|---|---|
| 0167039 | 10/1983 | Japan | 29/890.052 |
| 0165832 | 6/1990 | Japan | 29/890.052 |
| 2-169995 | 6/1990 | Japan . | |
| 2-309196 | 12/1990 | Japan . | |
| 3-18982 | 3/1991 | Japan . | |
| 0944094 | 12/1963 | United Kingdom | 29/890.052 |

*Primary Examiner*—Lowell A. Larson
*Assistant Examiner*—Michiel J. McKeon
*Attorney, Agent, or Firm*—Tilton, Fallon, Lungmus & Chestnut

[57] ABSTRACT

A method of making a brazeable metal pipe which has elliptical tube-insertion apertures and guide lugs extending from at least one of the opposite edges defining the minor axis of each aperture, with the guide lugs extending in the direction of insertion of flat tubes. The method in an embodiment comprises the steps of: bending a part of a raw strip, which may be previously embossed to form recesses, so as to provide a bulged portion arc-shaped in cross section and connected to at least one unbulged flat portions; pressing inwardly to form inward swells; subsequently punching each inward swell to provide the tube-insertion aperture so that at least one of the opposite edges located at ends of the minor axis of said aperture remains unpunched; and finally bending the at least one unbulged portions to produce the finished pipe. Alternatively, the method may comprise the step of: punching raw apertures through the raw strip so that each aperture has protrusions; bending it to form the bulged portion; bending the protrusions to give the guide lugs; and finally bending the unbulged portions, thus any complicated die is not needed and the pipe wall is protected well from being collapsed or deformed.

17 Claims, 29 Drawing Sheets

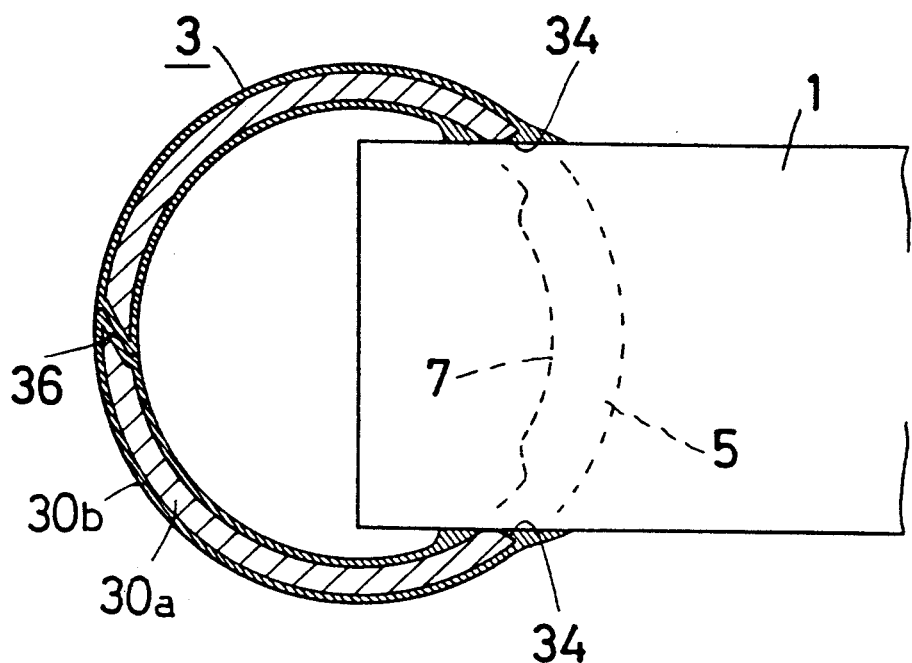
FIG. 3
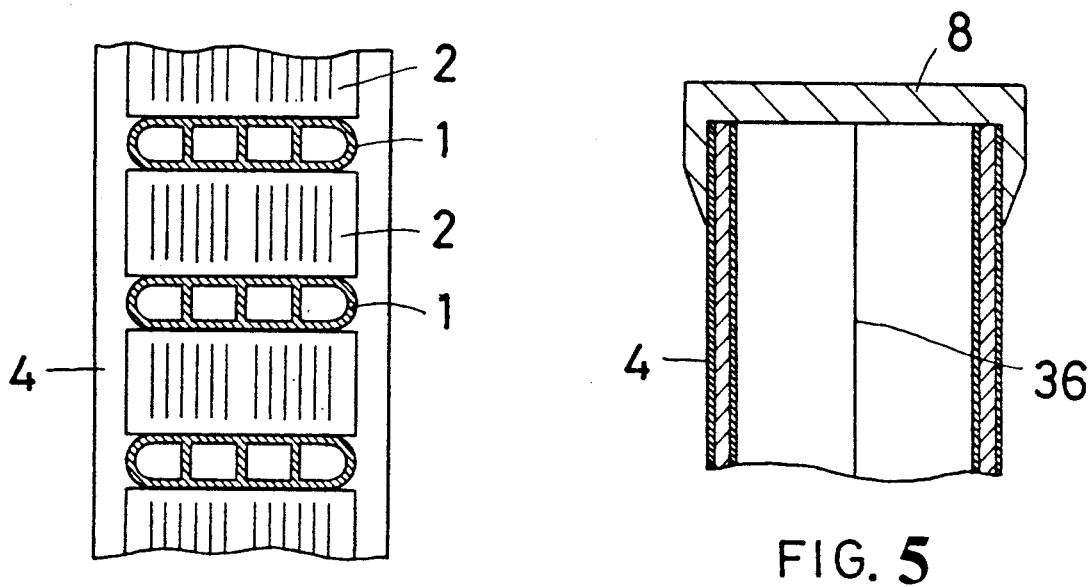
FIG. 4
FIG. 5

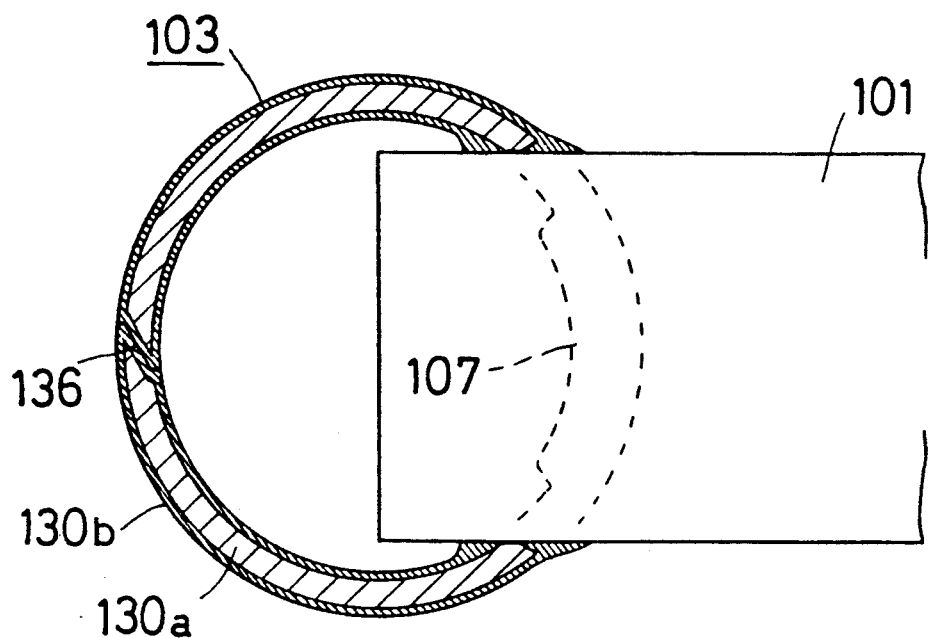
FIG. 34
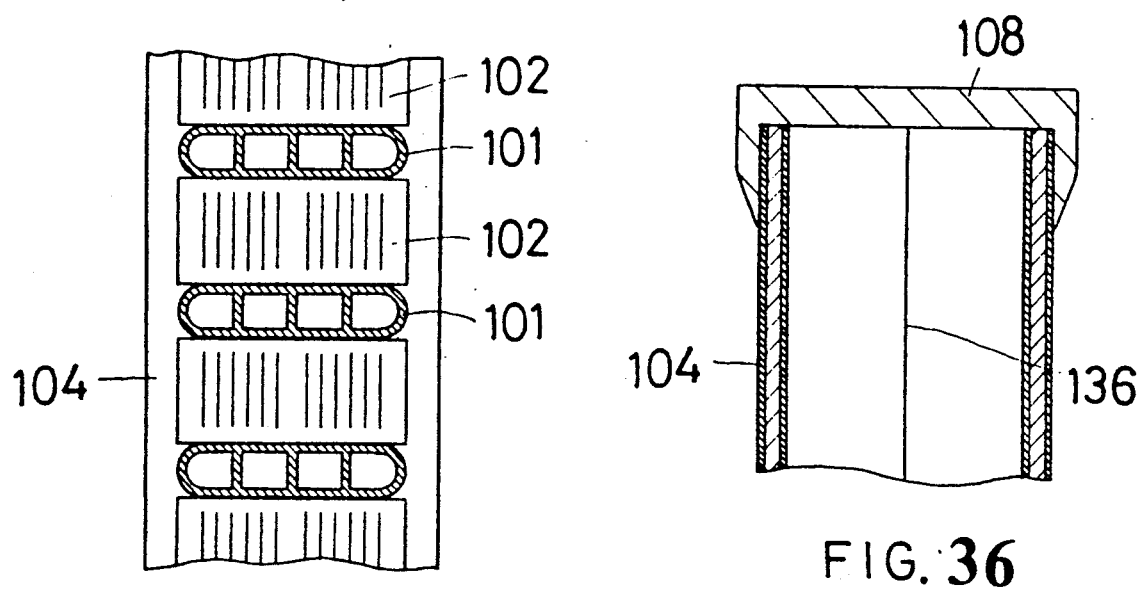
FIG. 35
FIG. 36

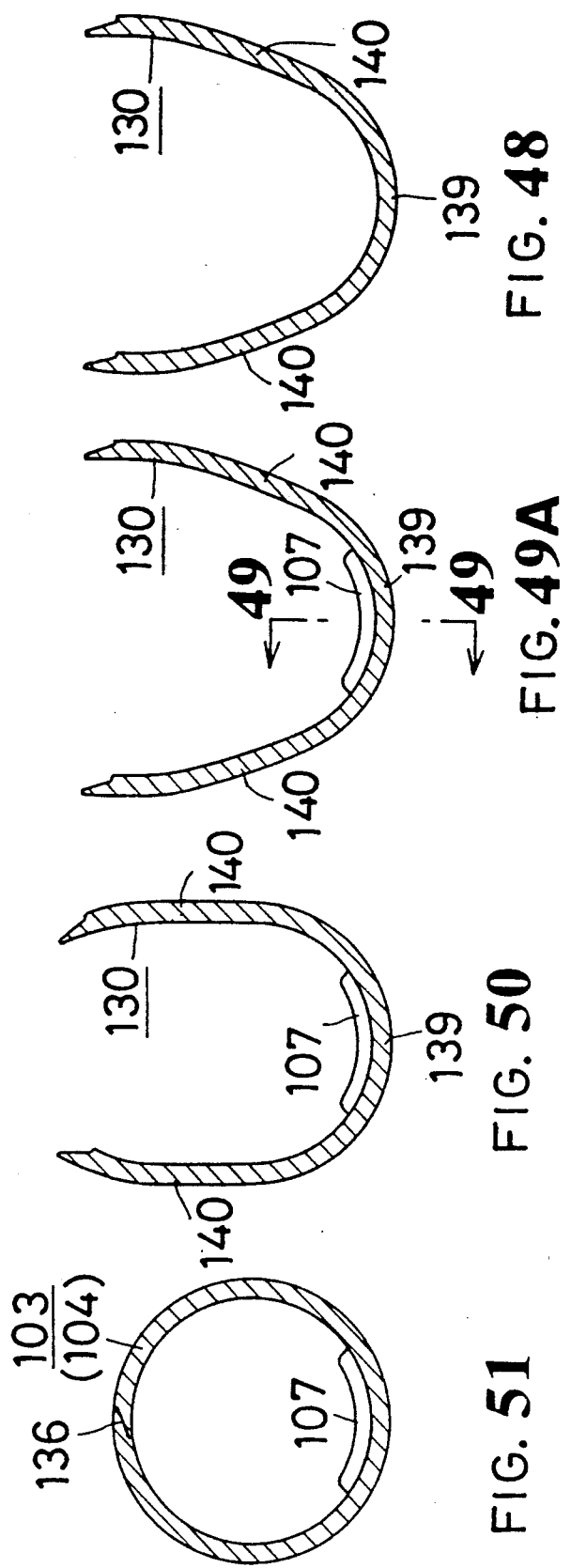

METHOD OF MAKING A BRAZEABLE METAL PIPE HAVING TUBE-INSERTION APERTURES FORMED WITH GUIDE LUGS

REFERENCE TO RELATED APPLICATIONS

This is a continuation of application Ser. No. 785,949, filed Oct. 31, 1991, which in turn is a continuation of application Ser. No. 351,778, filed May 15, 1989, both now abandoned.

BACKGROUND OF THE INVENTION

1. Field of the Invention

The present invention relates to a method of making a brazeable metal pipe made of a metal such as aluminum(including its alloys), and more particularly relates to a method of making a brazeable metal pipe having tube-insertion apertures formed with guide lugs, wherein the metal pipe is adapted for use as headers constituting heat exchangers such as a condenser, a radiator and an evaporator which are manufactured by the brazing method.

2. Description of the Prior Art

FIGS. 2A and 2B show an example of the conventional heat exchangers of the so-called parallel flow type, which comprises a pair of hollow headers 3 and 4 disposed in parallel with one another. This heat exchanger further comprises a plurality of flat tubes 1 having a depressed circular shape in cross section, with the flat tubes being also arranged in parallel with one another. Each flat tube has its both ends connected to the headers in fluid communication therewith. The heat exchanger still further comprises fins serving as heat release means, and each fin is interposed between the adjacent flat tubes.

It has been a general practice in making the headers 3 and 4 of the prior art heat exchangers that a brazing sheet, which comprises a core sheet having one or both surfaces thereof clad with a brazing substance layer, is rolled into a cylindrical shape. The apertures, which are of an elliptical shape identical with the cross-sectional shape of the flat tubes, are formed through the pipe's wall for receiving said tubes so as to form a row extending longitudinally of the pipe. Thus, the flat tubes 1 are inserted in the apertures of the headers 3 and 4 and brazed thereto so that they are secured one to another.

It will be noted here that the headers have been manufactured by punching such apertures through a seam-welded pipe made of the brazing sheet. Therefore, the pipe has been likely to be collapsed or deformed during the punching process.

In order to resolve this problem, the present Applicant proposed an improved method of making a brazeable pipe, wherein a raw strip composed of a brazing sheet is bent at first transversely or longitudinally to form a convex bulged portion. The bulged portion is then punched to provide the tube insertion apertures, before opposite sides of the raw strip are caused to abut each other and brazed one to another into a cylindrical shape (see Japanese Patent Publication Hei. 3-18982).

According to this improved method, an anvil of a shape similar to the bulged portion is fitted thereon when the apertures are punched. Thus, the previously proposed method is advantageous in that the pipe wall is well protected from being collapsed or deformed, thereby giving high precision pipes.

This method of making the brazeable metal pipe may be most effective if the tube insertion apertures are of an elliptical or other simple shape. However, if said apertures are not of such a simple shape but of a considerably sophisticated shape as is demanded recently, then certain new problems will take place as will be detailed below.

As shown in FIG. 1, guide lugs 7 are formed integral with at least one of edges defining therebetween the minor axis of an ellipse, i.e., the tube-insertion aperture 5 of the header. Those guide lugs 7 extend in parallel with the flat tube 1 so that each tube is readily and smoothly inserted into the aperture, and is held stable in place after inserted. Due to such guide lugs, the inserted tube has an increased surface area in contact with the periphery of the aperture, which is helpful both for support and brazing connection purposes.

It may be regarded as feasible to form each tube-insertion aperture with the guide lug 7 in such a manner that a raw or unfinished aperture of an elliptical shape is punched at first, wherein the raw aperture is surrounded by opposite edges between which the minor axis of the ellipse is defined, with the edges extending in opposite directions to provide protrusions which will become the guide lugs at the succeeding step when bent to take their position in the direction of the thickness of this raw strip.

It is however a new problem that a punching die of a sophisticated pattern need be used to form in one-shot operation the raw apertures through the raw strip which has the bulged portion previously bent into an arc-shaped contour. In detail, the die must have a cutter blade of such a three-dimensional configuration that is in a good alignment not only with the aperture in its plan view, but also with the arc-shaped contour in its side-elevational view. Such a complicated die cannot be manufactured at a low reasonable cost, and its cutter blade tends to be damaged or worn away in a short time.

SUMMARY OF THE INVENTION

An object of the present invention, which was made in view of the problems described above, is therefore to provide a method of making a brazeable metal pipe having a plurality of tube insertion apertures of an elliptical shape and also having guide lugs formed integral with and extending from at least one of the opposite peripheral edges defining therebetween the minor axis of ellipse, with the guide lugs extending in parallel with the direction of insertion of flat tubes into the aperture, wherein the method is composed such that any complicated punching die is not needed at all, and nevertheless the pipe wall is well protected from being collapsed or deformed when the tube insertion apertures are formed though said wall.

In order to achieve this object, the method proposed herein does employ a certain improvement made to the sequential combination of the steps of bending a portion of a raw strip to form a bulged portion arc-shaped in cross section, punching the apertures through the bulged portion, and then abutting and brazing opposite side edges of the raw strip one to another so as to form the pipe of a cylindrical shape, wherein the above combination itself is basically the same as our previous proposal mentioned hereinbefore.

From a first aspect of this invention summarized here using the reference numerals in the drawings, the method of making a brazeable metal pipe having a plurality of tube insertion apertures 5 of an elliptical shape and also having guide lugs 7 formed integral with and extending from at least one of the opposite peripheral edges defining therebetween the minor axis of the elliptical aperture 5, with the guide lugs extending in parallel with the direction of insertion of flat tubes 1 into the aperture, comprises the steps of: bending a middle region of the raw strip 30 transversely or longitudinally thereof so as to form a bulged portion 39 arc-shaped in cross section and interposed between unbulged flat portions 40 and 40, with the raw strip 30 being a brazing sheet comprising a core sheet 30a which has either or both surfaces covered with a brazing substance layer 30b; thereafter pressing predetermined zones of the bulged portion 39 in the direction of its thickness so as to form inward swells 42, the predetermined zones being at locations where the tube-insertion apertures are to be punched later; subsequently punching each inward swell 42 to form the tube-insertion aperture 5 of an elliptical shape in such a manner that at least one of opposite edges facing one another in the direction of the minor axis of the elliptical aperture remains unpunched; and finally bending the unbulged flat portions 40 and 40 of the raw strip 30 so that their side edges abut each other to form the cylindrical pipe.

From a second aspect of this invention, the method of making a brazeable metal pipe having a plurality of tube insertion apertures 5 of an elliptical shape and also having guide lugs 7 formed integral with and extending from at least one of the opposite peripheral edges defining therebetween the minor axis of the elliptical aperture 5, with the guide lugs extending in parallel with the direction of insertion of flat tubes 1 into the aperture, comprises the steps of: embossing predetermined small zones of a raw strip 30 to form at least one pair of recesses 31 of a smaller thickness than the raw strip, the raw strip 30 being a brazing sheet comprising a core sheet 30a which has either or both surfaces covered with a brazing substance layer 30b, and the portions being at locations where side ends of each aperture are to be formed later; then bending a middle region of the raw strip 30 transversely or longitudinally thereof so as to form a bulged portion 39 arc-shaped in cross section and interposed between unbulged flat portions 40 and 40, with the bulged portion 39 including the recesses 31; thereafter pressing an intermediate zone between the recesses 31 and 31 of the bulged portion 39 in the direction of its thickness so as to form an inward swell 42 for each pair of the recesses; subsequently punching the recesses 31 and the inward swell 42 to form each tube-insertion aperture 5 of an elliptical shape 5 in such a manner that at least one of opposite edges facing one another in the direction of the minor axis of the elliptical aperture remains unpunched; and finally bending the unbulged flat portions 40 and 40 of the raw strip 30 so that their side edges abut each other to form the cylindrical pipe.

It is desirable to carry out the modes of the method proposed herein, in such a manner that the steps including another step of preparing the raw strip are effected continuously while an elongate brazing sheet is transported intermittently and longitudinally. Therefore, according to a third aspect of the present invention, the method of making a brazeable metal pipe having a plurality of tube insertion apertures 5 of an elliptical shape and also having guide lugs 7 formed integral with and extending from at least one of the opposite peripheral edges defining therebetween the minor axis of the elliptical aperture 5, with the guide lugs extending in parallel with the direction of insertion of flat tubes 1 into the aperture, comprises the steps of: preliminarily forming a plurality of raw strips 30 by removing unnecessary portions from a brazing sheet 50 comprising a core sheet 30a which has either or both surfaces covered with a brazing substance layer 30b, so that the raw strips are connected to each other by ears 51 which extend from longitudinal or transverse opposite sides of said raw strips and are integral with common outer supporting bands 52; then bending a middle region of the raw strip 30 transversely or longitudinally thereof so as to form a bulged portion 39 arc-shaped in cross section; thereafter drawing predetermined zones of the bulged portion 39 in the direction of its thickness so as to form inward swells 42, the predetermined zones being at locations where the tube-insertion apertures are to be punched later; subsequently punching each inward swell 42 to form the tube-insertion aperture 5 of an elliptical shape in such a manner that at least one of opposite edges facing one another in the direction of the minor axis of the elliptical aperture remains unpunched; further bending unbulged flat portions 40 and 40 of the raw strip 30 so that their side edges abut each other to form each of the cylindrical pipes which are connected one to another through the respective ears 51 and by the common supporting bands 52; and finally separating each pipe from the common supporting bands 52, wherein these steps are carried out continuously while the elongate brazing sheet is transported longitudinally.

According to a fourth aspect of the present invention, the method of making a brazeable metal pipe having a plurality of tube insertion apertures 5 of an elliptical shape and also having guide lugs 7 formed integral with and extending from at least one of the opposite peripheral edges defining therebetween the minor axis of the elliptical aperture 5, with the guide lugs extending in parallel with the direction of insertion of flat tubes 1 into the aperture, may also be conducted in a continuous manner and comprises the steps of: preliminarily forming a plurality of raw strips 30 by removing unnecessary portions from a brazing sheet 50 comprising a core sheet 30a which has either or both surfaces covered with a brazing substance layer 30b, so that the raw strips are connected to each other by ears 51 which extend from longitudinal or transverse opposite sides of said raw strips and are integral with common outer supporting bands 52; embossing predetermined small zones of the brazing sheet 50 or of the raw strip 30 to form at least one pair of recesses 31 of a smaller thickness than the raw strip, the portions being at locations where side ends of each aperture are to be formed later; then bending a middle region of the raw strip 30 transversely or longitudinally thereof so as to form a bulged portion 39 arc-shaped in cross section and interposed between unbulged flat portions 40 and 40, with the bulged portion 39 including the recesses 31; thereafter pressing an intermediate zone between the recesses 31 and 31 of the bulged portion 39 in the direction of its thickness so as to form an inward swell 42 for each pair of the recesses; subsequently punching the recesses 31 and the inward swell 42 to form each tube-insertion aperture 5 of an elliptical shape in such a manner that at least one of opposite edges facing one another in the direction of the minor axis of the elliptical aperture remains unpunched; further bending the unbulged flat portions 40 and 40 of the raw strip 30 so that their side edges abut each other to form each of the cylindrical pipes which are connected one to another through the respective ears 51 and by the common supporting bands 52; and finally separating each pipe from the common supporting bands 52, wherein these steps are carried out continuously while the elongate brazing sheet is transported longitudinally.

It is also desirable that a pressed material-absorbing hole 32 is formed through the raw strip 30 at each zone thereof where the recess 31 is to be formed subsequently.

As described above, the method is characterized in that the middle region of the raw strip 30 is bent transversely or longitudinally thereof to form the arc-shaped bulged portion 39, and subsequently the predetermined zones where the tube-insertion apertures are to be formed later are pressed inwardly to form the inward swells 42, before the thus formed inward swell 42 is subsequently punched such that at least one of the opposite edges defining the ends of the minor axis remains unpunched. Therefore, after the elliptical tube-insertion apertures 5 is punched directly, the unpunched edges per se around the inward swell 42 will appear as the guide lugs 7. The protrusions extending along the edges which are located at the ends of minor axis of the raw aperture are no more necessary. Because no pipe portion itself but the bulged portion 39 is punched herein, an anvil of a shape fittable on the surface of the bulged portion can be set thereon before punching the same so that the pipe wall portion is neither collapsed nor is deformed.

In the preferable case wherein at least one pair of the thin recesses 31 are embossed at the zones where the lateral ends of each tube-insertion aperture are formed later, the strip 30 can be punched smoothly at the recesses when the apertures are formed, whereby any flashes which might hinder the flat tube being inserted without difficulty are scarcely produced at the lateral ends of each tube-insertion aperture.

In the further preferable case wherein all the steps from the step of preliminarily forming raw strips 30 to the step of separating the finished pipes are conducted in a continuous manner with the elongate brazing sheet being transported intermittently and longitudinally, the metal pipes having the apertures each formed with the guide lugs are manufactured successively at an improved efficiency.

In the still further desirable case wherein the swelled material-absorbing hole 32 is preformed through the raw strip 30 at the zones where the recesses 31 are pressed subsequently, the material which is pressed out of each recess will not flow outwardly but is absorbed by the hole, thereby preventing an undesirable deformation or thickening of the strip portion around the recess.

From a fifth aspect of this invention, the method of making a brazeable metal pipe having a plurality of tube-insertion apertures 105 of an elliptical shape and also having guide lugs 107 formed integral with and extending from at least one of the opposite peripheral edges defining therebetween the minor axis of the elliptical aperture 105, with the guide lugs extending in parallel with the direction of insertion of flat tubes 101 into the aperture, comprises the steps of: punching a raw strip 130 to form raw or unfinished apertures 131 of a shape corresponding to the tube-insertion apertures in such a manner that opposite edges facing one another in the direction of the minor axis of the elliptical aperture remains unpunched to provide protrusions 132, the raw strip 130 being a brazing sheet comprising a core sheet 130a which has either or both surfaces covered with a brazing substance layer 130b; then bending a middle region of the raw strip 130 transversely or longitudinally thereof so as to form a bulged portion 139 arc-shaped in cross section and interposed between unbulged flat portions 140 and 140, with the bulged portion 139 including the raw apertures 131; thereafter bending the raw apertures 131 so that the protrusions 132 become the guide lugs 107; and finally bending the unbulged flat portions 140 and 140 of the raw strip 130 so that their side edges abut each other to form the cylindrical pipe.

It is desirable to carry out the method just described above in such a manner that the steps including another step of preparing the raw strip are effected continuously while an elongate brazing sheet is transported intermittently and longitudinally. Therefore, according to a sixth aspect of the present invention, the method of making a brazeable metal pipe having a plurality of tube insertion apertures 105 of an elliptical shape and also having guide lugs 107 formed integral with and extending from at least one of the opposite peripheral edges defining therebetween the minor axis of the elliptical aperture 105, with the guide lugs extending in parallel with the direction of insertion of flat tubes 101 into the aperture, comprises the steps of: preliminarily forming a raw strip 130 by removing unnecessary portions from a brazing sheet 150 comprising a core sheet 130a which has either or both surfaces covered with a brazing substance layer 130b, so that the raw strip is connected to another succeeding raw strip by ears 151 which extend from longitudinal or transverse opposite sides of said raw strips and are integral with common outer supporting bands 152; punching the raw strip 130 or the brazing sheet 150 to form raw or unfinished apertures 131 of a shape corresponding to the tube-insertion apertures in such a manner that opposite edges facing one another in the direction of the minor axis of the elliptical aperture remains unpunched to provide protrusions 132; then bending a middle region of the raw strip 130 transversely or longitudinally thereof so as to form a bulged portion 139 arc-shaped in cross section and interposed between unbulged flat portions 140 and 140, with the bulged portion 139 including the raw apertures 131; thereafter bending the raw apertures 131 so that the protrusions 132 become the guide lugs 107; subsequently bending the unbulged flat portions 140 and 140 of the raw strip 130 so that their side edges abut each other to form the cylindrical pipe; and finally separating each pipe from the common supporting bands 152, wherein these steps are carried out continuously while the elongate brazing sheet is transported longitudinally.

It is also desirable that, before the bending of the raw strip 130 to form the bulged portion 139, opposite arcuate edges of each raw aperture 131 are pressed to be chamfered at their inner corners so that tapered surfaces 133 are provided, with the arcuate edges being located at ends of the major axis of the elliptical aperture Such tapered surfaces 133 will become parallel with the flat tubes inserted in the finished apertures, when the raw strip is bent to give the pipe. On the other hand, outer corners of the opposite arcuate edges provide upright surfaces 134 extending half a thickness of the raw strip, and will be slanted outwardly in the finished pipe.

As described above, the method is characterized in that the middle region of the raw strip 130 is bent transversely or longitudinally thereof to form the arc-shaped bulged portion including the raw apertures 131, after these apertures of the shape corresponding to the tube-insertion apertures have been punched such that the opposite edges defining the ends of the minor axis remains unpunched to provide the protrusions which will become the guide lugs. Therefore any complicated punching die, which has been needed in the prior art method for forming the raw apertures through the pipe, is no more necessary herein, and nevertheless the pipe wall is neither collapsed nor is deformed any more in the method of this invention.

In the preferable case wherein all the steps from the step of preliminary forming raw strips 130 to the step of separating the finished pipes are conducted in a continuous manner with the elongate brazing sheet 150 being transported intermittently and longitudinally, the metal pipes having the apertures each with formed guide lugs are manufactured successively at an improved efficiency.

In the further desirable case wherein, before the bending of the raw strip 130, the opposite arcuate edges of the raw aperture 131 are chamfered at their inner corners to provide the tapered surfaces 133, with their outer corners providing the upright surfaces 134 extending half a thickness of the raw strip, the upright surfaces 134 become tapered to form guide surfaces 134' and the tapered surfaces 133 become parallel surfaces 133' after the raw strip is bent. Thus, when each flat tube 101 is inserted in the aperture 105 of the headers 103 and 104, its lateral sides are guided by the guide surfaces 134' at initial stage of insertion and are further guided successively by the parallel surfaces 133' for smooth insertion.

Other objects and advantages of the present invention will become more apparent from the following detailed description, when taken in conjunction with the accompanying drawings which show, for the purpose of illustration only, one embodiment in accordance with the present invention.

BRIEF DESCRIPTION OF THE DRAWINGS

FIGS. 1 to 31 show a first embodiment, in which;

FIG. 1 is a perspective view showing a header pipe and flat tubes in their disassembled state, the header pipe being a brazeable pipe which is manufactured according to the present invention and is employed in a heat exchanger;

FIG. 3 is a cross section taken along the line 3—3 in FIG. 2A;

FIG. 4 is a cross section taken along the line 4—4 in FIG. 2A;

FIG. 5 is a cross section taken along the line 5—5 in FIG. 2A;

FIG. 6 is a vertical cross section of the brazeable pipe which is manufactured according to the present invention;

FIG. 7 is a cross section taken along the line 7—7 in FIG. 6;

FIG. 8 is a front elevation of the brazeable pipe;

FIG. 9 is a rear elevation of the brazeable pipe;

FIG. 10 is a perspective view of a raw strip which is a brazing sheet, and from which strip the brazeable pipe is manufactured;

FIG. 11 is a cross section taken along the line 11—11 in FIG. 10;

FIG. 12 is a plan view showing swelled substance-absorbing holes which are punched through the raw strip;

FIG. 13 is a plan view showing recesses which are formed by pressing the surface of the raw strip;

FIG. 14 is a cross section taken along the line 14—14 in FIG. 13;

FIG. 15 is a plan view showing slits and cutouts which are formed through the raw strip, and the slits being adapted to receive a partition plate inserted therein, with the cutouts being adapted to receive a coolant inlet or outlet similarly inserted therein;

FIG. 16 is a cross section showing the raw strip whose opposite lateral edges are chamfered;

FIG. 17 is a perspective view showing a bulged portion which is formed by bending a middle region of the raw strip;

FIG. 18 is a perspective view showing inward swells which are formed by inwardly pressing intermediate zones each located between the opposite recesses;

FIG. 19 is a cross section taken along the line 19—19 in FIG. 18;

FIG. 20 is a cross section taken along the line 20—20 in FIG. 19;

FIG. 21 is a perspective view showing tube-insertion apertures which are punched through the raw strip;

FIG. 22 is a cross section taken along the line 22—22 in FIG. 21;

FIG. 23 is a cross section taken along the line 23—23 in FIG. 22;

FIG. 24 is a cross section showing the raw strip bent into a reversed V-shape;

FIG. 25 is a cross section showing the raw strip bent into a reversed U-shape;

FIG. 26 is a cross section showing the raw strip which is further bent to form a finished pipe;

FIG. 27 is a perspective view showing an elongate brazing sheet whose leading end has a plurality of swelled material-absorbing holes, which are punched through the brazing sheet in a continuous manufacture process;

FIG. 28 is a perspective view showing the elongate brazing sheet which is shown in FIG. 27 and has been transported forwardly and subjected to a following step of the manufacture process;

FIG. 29 is a perspective view showing the elongate brazing sheet which has been transported further and has been subjected to the next step of said process;

FIG. 30 and FIG. 31 are perspective views showing the elongate brazing sheet which has been transported still further, but is not yet subjected to the final step where the pipes are separated;

FIGS. 32 to 55 show a second embodiment, in which;

FIG. 32 is a perspective view showing a header pipe and flat tubes in their disassembled state, the header pipe being a brazeable pipe which is manufactured according to the present invention and is employed in a heat exchanger;

FIG. 34 is a cross section taken along the line 34—34 in FIG. 33A;

FIG. 35 is a cross section taken along the line 35—35 in FIG. 33A;

FIG. 36 is a cross section taken along the line 36—36 in FIG. 33A;

FIG. 37 is a vertical cross section of the brazeable pipe which is manufactured according to the present invention;

FIG. 38 is a cross section taken along the line 38—38 in FIG. 37;

FIG. 39 is a front elevation of the brazeable pipe;

FIG. 40 is a rear elevation of the brazeable pipe;

FIG. 41 is a perspective view of a raw strip which is a brazing sheet, and from which strip the brazeable pipe is manufactured;

FIG. 42 is a cross section taken along the line 42—42 in FIG. 41;

FIG. 43 is a perspective view showing raw or unfinished apertures which are punched through the raw strip;

FIG. 44 is a cross section taken along the line 44—44 in FIG. 43;

FIG. 45 is a cross section showing the raw strip whose opposite lateral edges are chamfered;

FIG. 46 is a plan view showing slits and a cutout, the slits being adapted for receiving a partition, and the cutout receiving a coolant inlet or outlet;

FIG. 47 is a perspective view showing a bulged portion which is formed by bending a middle region of the raw strip;

FIG. 48 is a cross section showing the raw strip bent into a V-shape;

FIG. 49A is a cross section showing guide lugs formed by the bending process;

FIG. 49B is a cross section taken along the line 49—49 in FIG. 49A;

FIG. 50 is a cross section showing the raw strip bent into a U-shape;

FIG. 51 is a cross section showing the raw strip which is further bent to form a finished pipe;

FIG. 52 is a perspective view showing an elongate brazing sheet whose leading end is punched to form the raw strip;

FIG. 53 is a perspective view showing the elongate brazing sheet which is shown in FIG. 52 and has been transported forward and subjected to a following step of the manufacture process; and FIG. 54 and FIG. 55 are perspective views showing the elongate brazing sheet which has been transported further to undergo the succeeding steps, but is not yet subjected to the final step where the pipes are separated.

THE PREFERRED EMBODIMENTS

First Embodiment

A first embodiment will now be described referring at first to FIGS. 1 to 5, wherein a header pipe is manufactured for use in an aluminum (or its alloy) heat exchanger which may be employed as a condenser in the car cooler system.

In FIGS. 1 to 5, a plurality of flat tubes 1 extend horizontal and are stacked one above another in the vertical direction, with corrugated fins 2 each being interposed between the two adjacent tubes 1. This heat exchanger further comprises a pair of right and left aluminum headers 3 and 4 of a circular cross-sectional shape, each header being a brazeable pipe which is produced according to the method provided by the invention.

The headers 3 and 4 are manufactured in the following manner.

Figure 10:
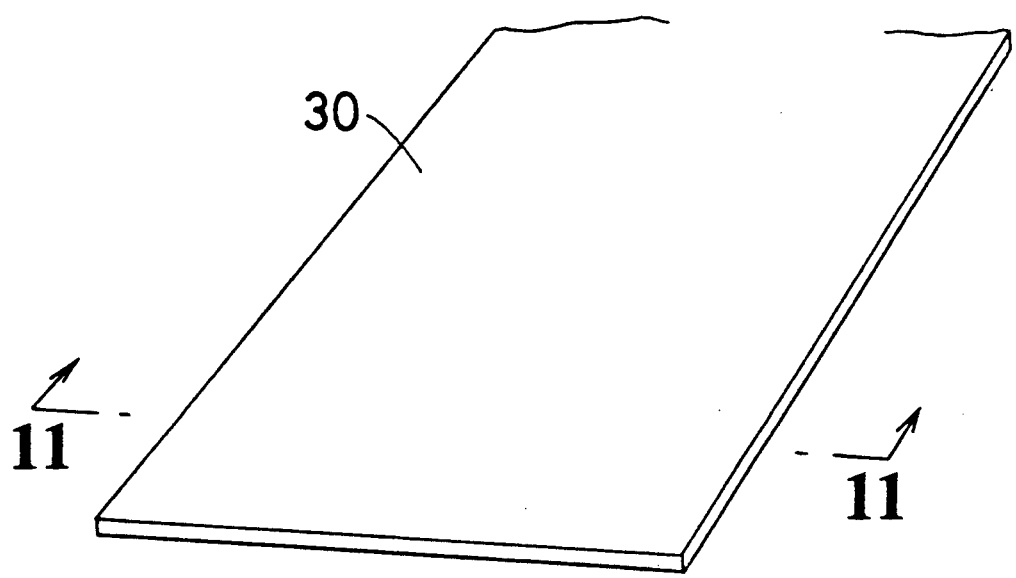
Figure 11:
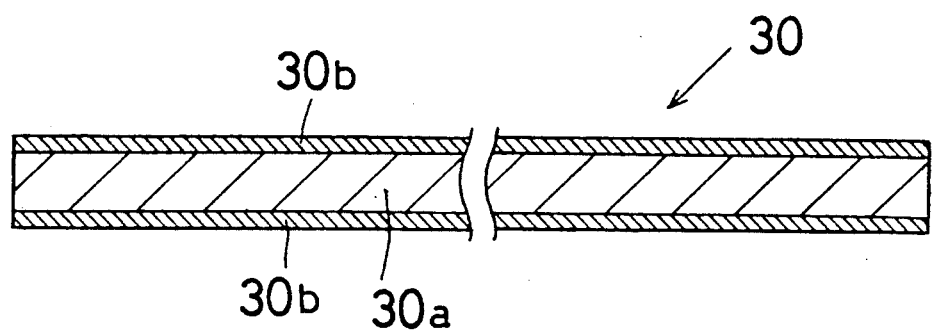
Figure 12:
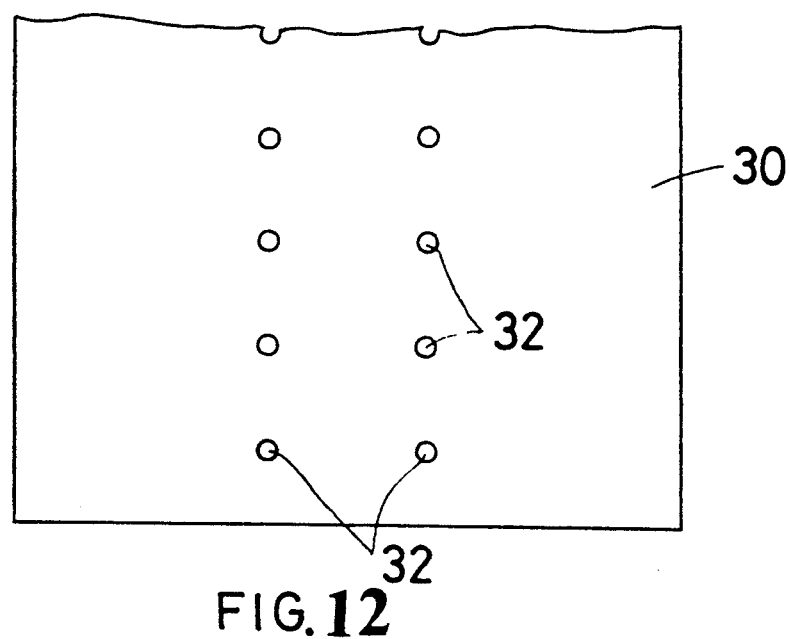
Figure 13:
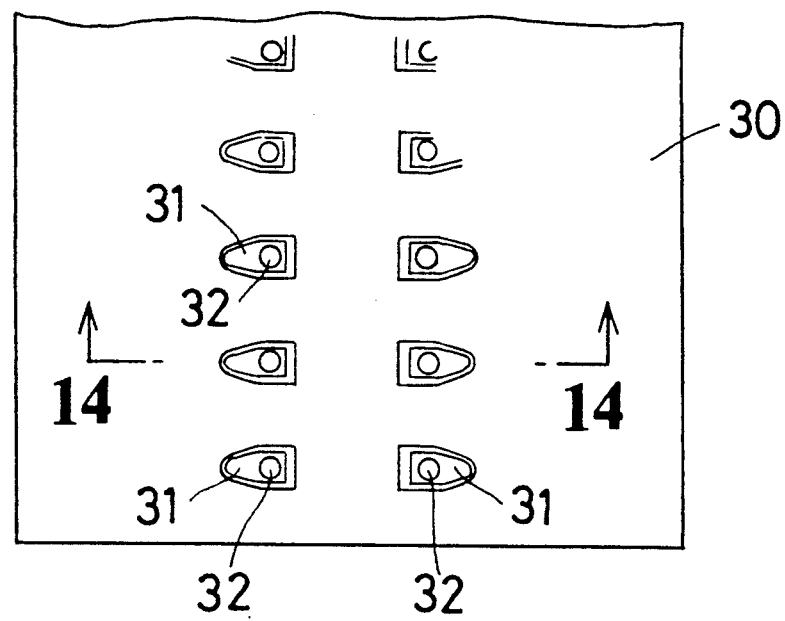
Figure 14:
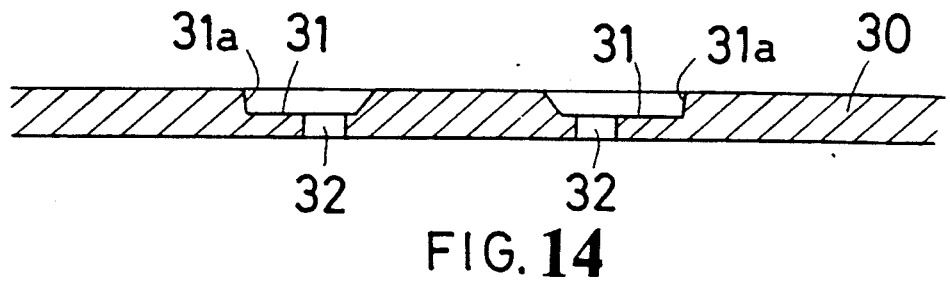

As shown in FIGS. 10 and 11, a raw strip 30 is prepared at first, which strip comprises an aluminum core sheet 30a having both surfaces covered with a brazing substance layer 30b. The brazing substance layer 30b may generally be an alloy of Al-Si series which contains about 6-13% by weight of Si. Next, predetermined zones of the raw strip may preferably be embossed for example in such a manner as shown in FIGS. 13 and 14. Small zones at locations where opposite ends of each tube-insertion aperture are to be formed later are embossed to provide D-shaped recesses 31 of a smaller thickness than the strip. Those D-shaped recesses 31 will prevent any flashes from being produced at opposite ends of the tube-insertion aperture 5 when it is punched at another step described below. The apertures in this embodiment are formed at regular intervals along the raw strip 30 such that the major axis of each aperture 5 coincides with the transverse width of the strip. Therefore, the recesses 31 in each pair are symmetric with one another with respect to a center line of the raw strip 30, and a given number of such pairs are arranged longitudinally of said strip.

It will be understood that the embossing step can be dispensed with herein.

It will be noted also that the embossing of each recess 31 may cause the pressed substance of the raw strip to swell outwardly of the recess, thereby thickening said strip around the recess. Such an outward swelling of material may produce an irregularity in the shape of edges around the punched aperture 5, which irregularity might result in an undesirable flash. It is therefore desirable that a swelled material-absorbing hole 32 is punched at first through the raw strip 30 at its zone where each recess 31 will be formed subsequently.

An outer edge 31a (see FIG. 14) of each recess 31 is preferably perpendicular to the flat surface of raw strip or slightly slanted outwardly with respect to the normal line in the direction of thickness. With such a configuration, the edges 31a in the finished pipe shown in FIGS. 7 and 8 will be tapered outwardly from a middle point in the direction of thickness towards the outer surface of said strip. Thus, the edges 31a will serve as guide surfaces 34 which facilitate the insertion of the flat tube.

Figure 15:
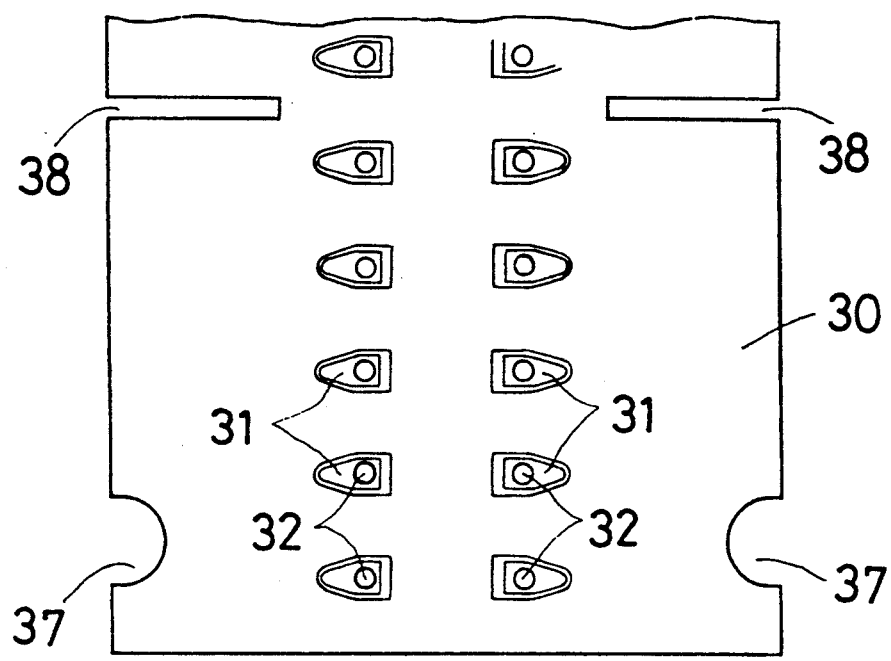

At the next step shown in FIG. 15, cutouts 37 for connecting a coolant inlet or outlet are punched at opposite lateral side zones of the strip 30. Similarly, slits 38 are punched at other opposite side zones of said strip, and these slits will be coupled with one another to provide an integral opening or slit 11 in which a partition 6 of the heat exchanger shown in FIGS. 1 to 5 is inserted and secured. The partition 6 causes the coolant to flow in a meandering manner within the heat exchanger.

Figure 1:
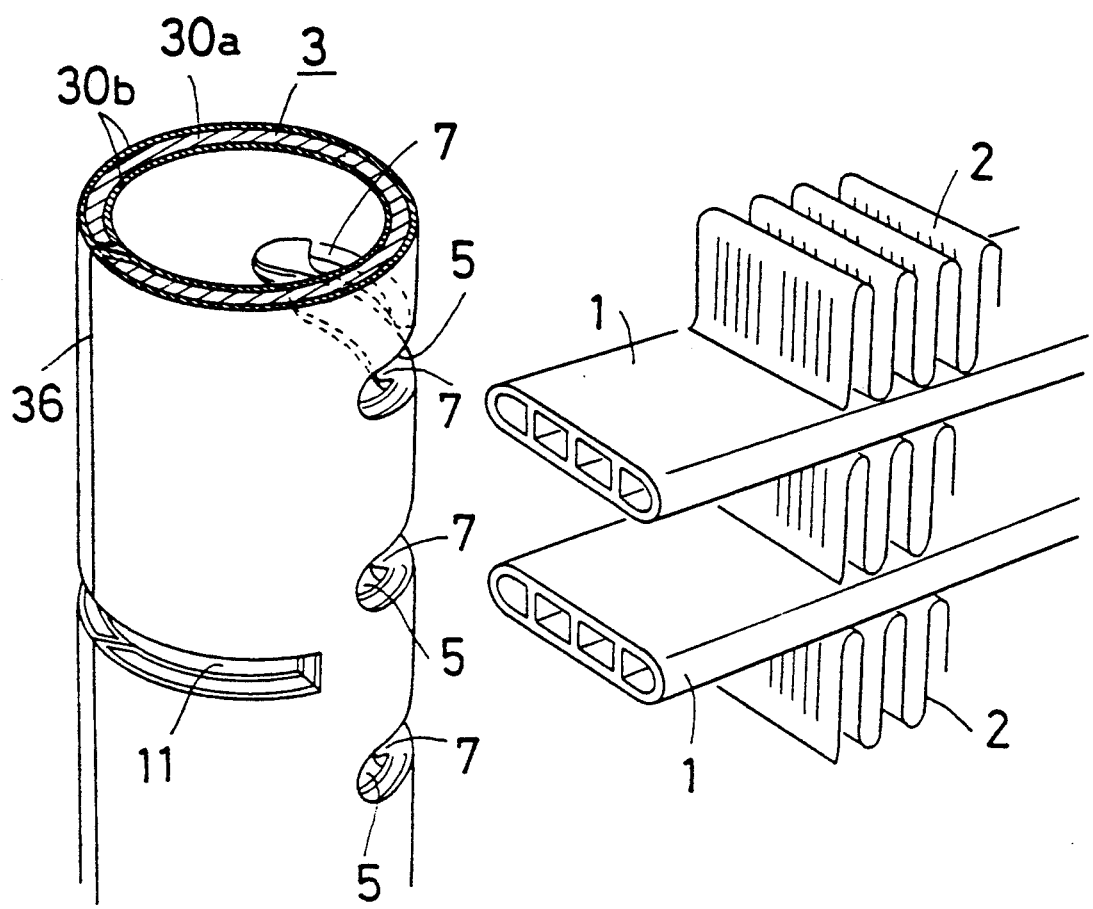
Figure 2A:
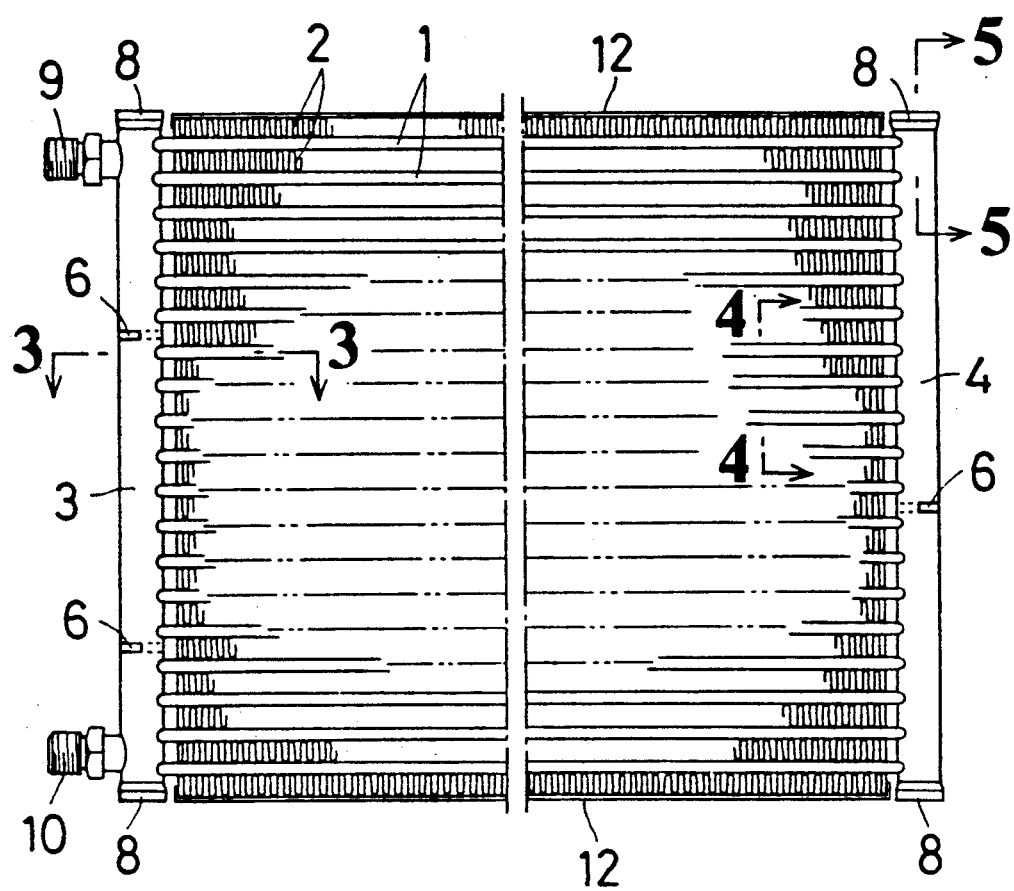
FIG. 2A is a front elevation of the heat exchanger shown in FIG. 1.
Figure 2B:
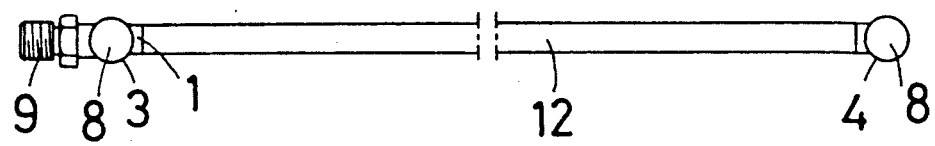
FIG. 2B is a plan view of the heat exchanger shown in FIG. 1.
Figure 6:
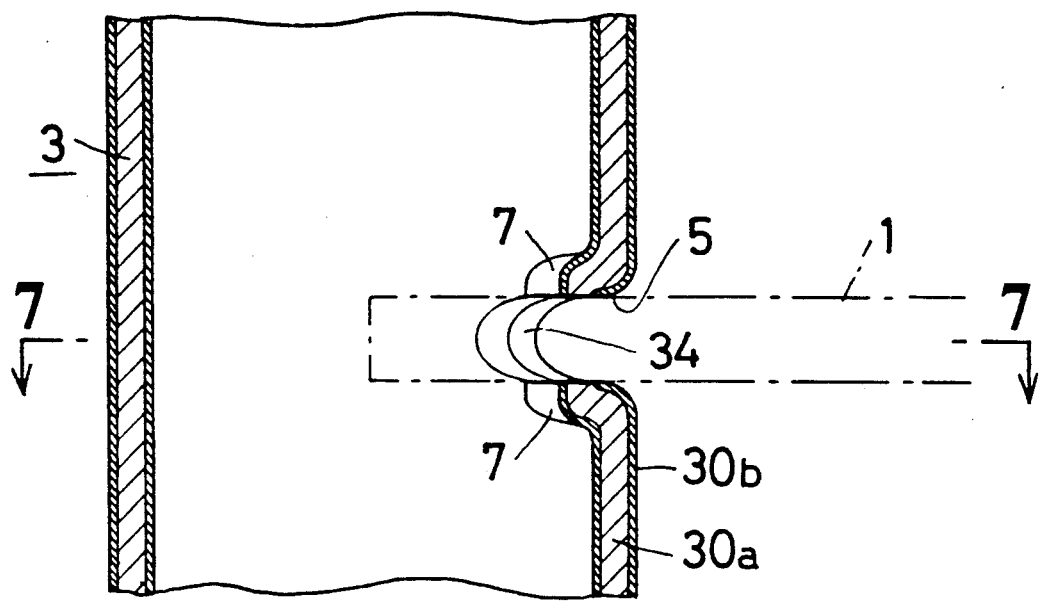
Figure 7:
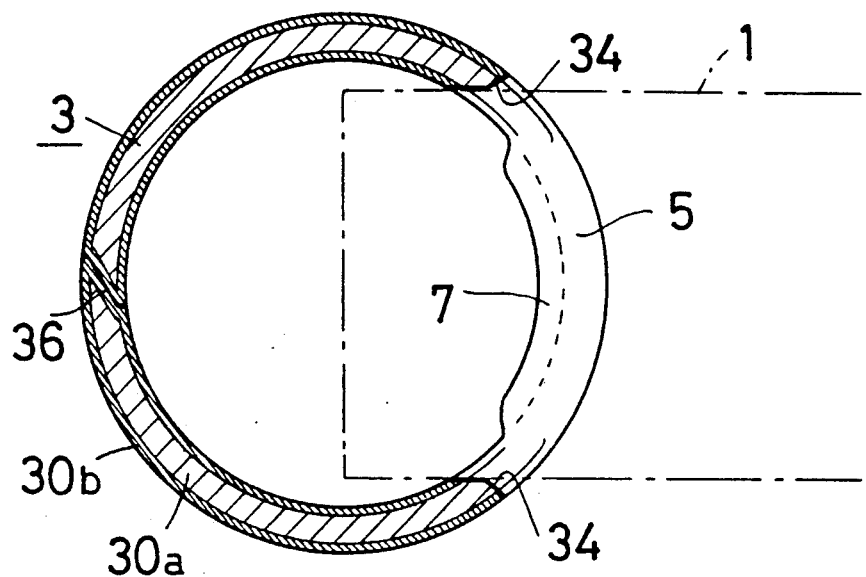
Figure 8:
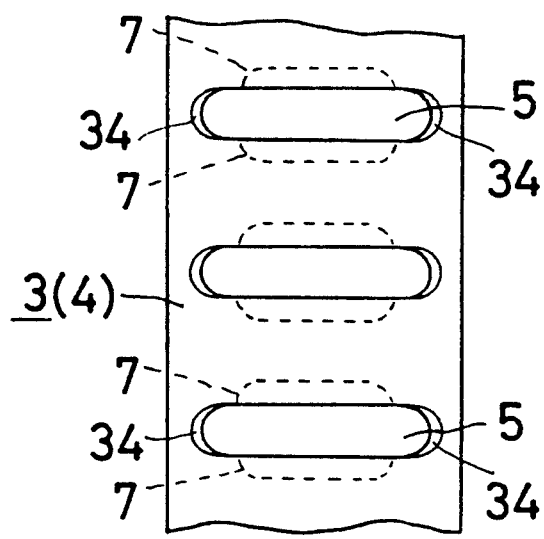
Figure 9:
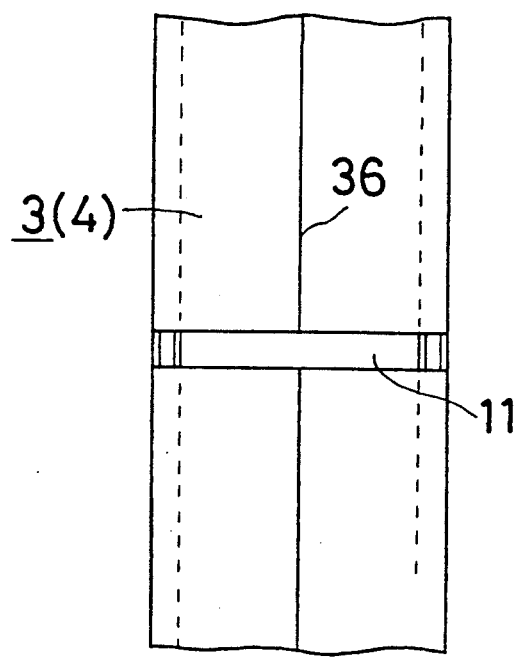
Figure 16:
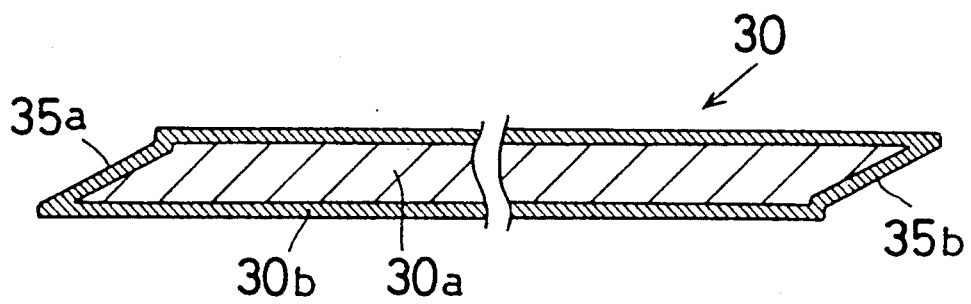

Subsequently, lateral ends of the raw strip 30 is pressed in the direction of its thickness. This pressing of lateral ends is effected in opposite directions, i.e., upwardly for one of the lateral ends and downwardly for the other lateral end. Thus, as shown in FIG. 16, one of the thus chamfered or slanted ends 35a becomes thinner from its lower edge towards its upper edge, while the other slanted end 35b contrarily becomes thinner from its upper edge towards its lower edge. Both the slanted ends are covered with the brazing substance layer 30b. Such slanted ends 35a and 35b are brought into abutment 36 as shown in FIG. 7. Due to the brazing substance layer present in the abutment 36, a liquid-tight and strong junction will be ensured between the mating ends after the brazing process is carried out. Alternatively, the chamfering may be done before the punching of said cutouts 37 and slits 38.

Figure 17:
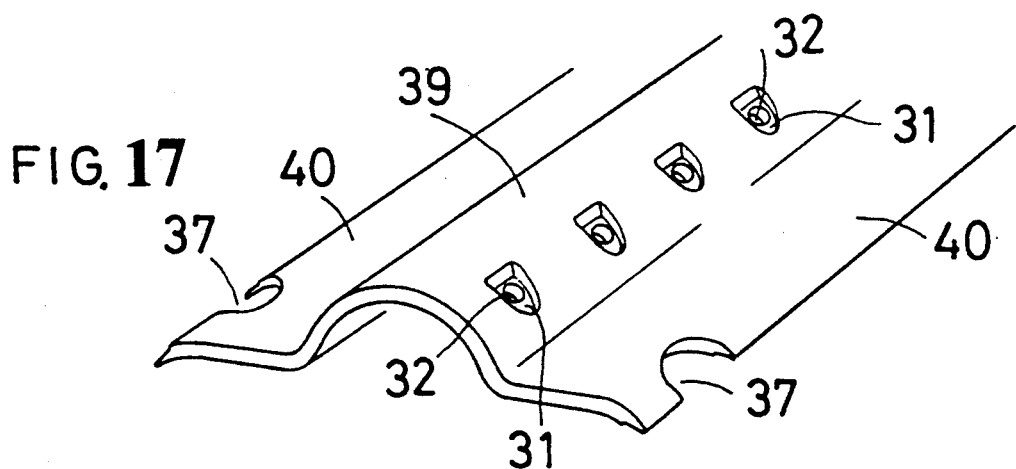

At the next step shown in FIG. 17, the pressing or other appropriate process is carried out so that the raw strip 30 is bent to be arc-shaped in cross section at its middle and transverse region including all of the already embossed recesses 31. A bulged portion 39 of a hat-like shape in cross section is thus provided, and the recesses 31 are disposed on an outer surface of the hat-like bulged portion.

Figure 18:
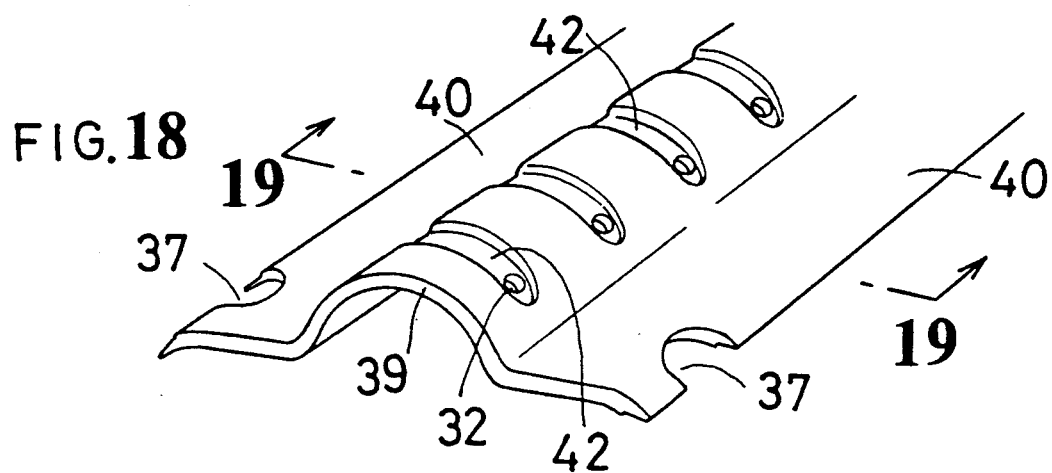
Figure 19:
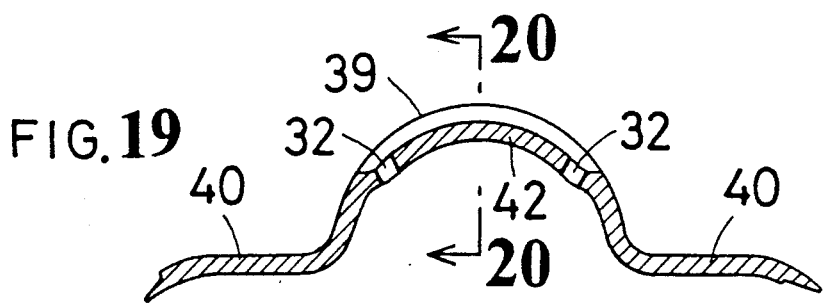
Figure 20:
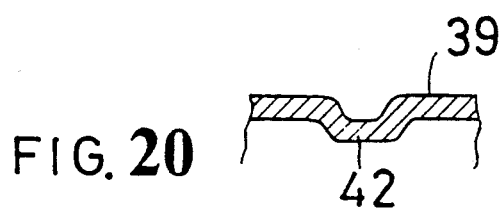

At a further step shown in FIGS. 18 to 20, the beading process as one of the appropriate pressing processes will be carried out to press inwardly of the bulged portion 39 an intermediate zone between each pair of the recesses 31 and 31. Inward swells 42 formed in this manner have along their minor axis a width slightly smaller than the width of the tube-insertion apertures which will be punched at the succeeding step.

Figure 21:
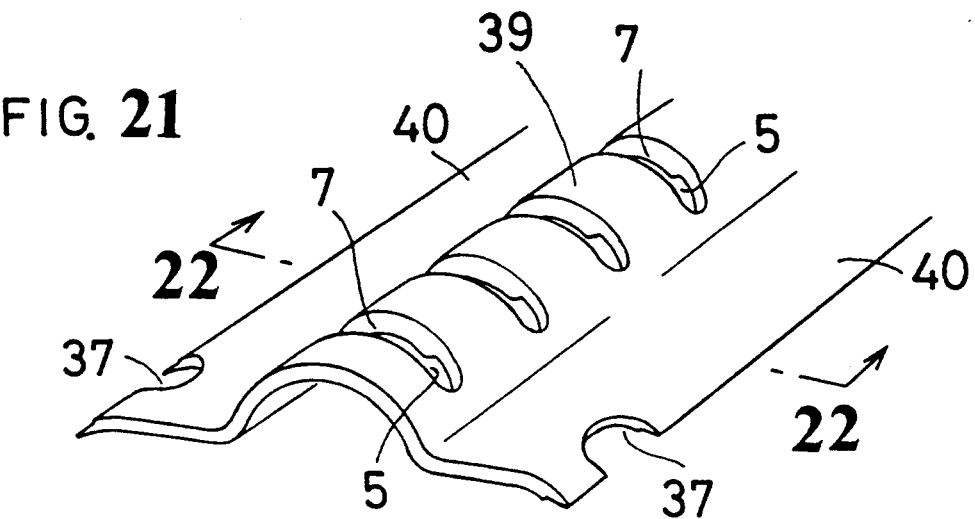
Figure 22:
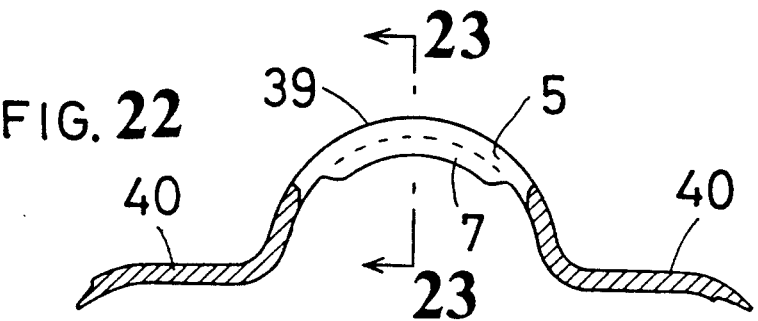
Figure 23:
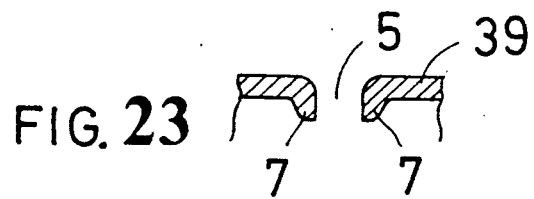

At the succeeding step shown in FIGS. 21 to 23, elliptical apertures 5 for receiving the flat tubes inserted therein are formed each by punching the inward swell 42 and the corresponding recesses 31. As the width of each inward swell 42 is slightly smaller than the tube-insertion aperture 5 in the direction of its minor axis, the narrow areas close to the opposite side edges of the inward swell 42 and extending perpendicular to the minor axis will remain unremoved even after the punching process is executed at this step. Such remaining areas will become the guide lugs 7 which are integral with each finished aperture 5 and facilitate the insertion of the flat tube. It is also noted that since the recesses 31 are thinner than the neighboring portions of the strip, they can be punched off smoothly without producing any flash adjacent to them.

Figure 24:
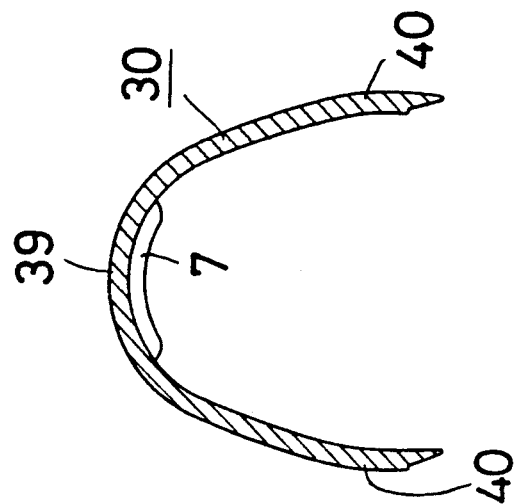
Figure 25:
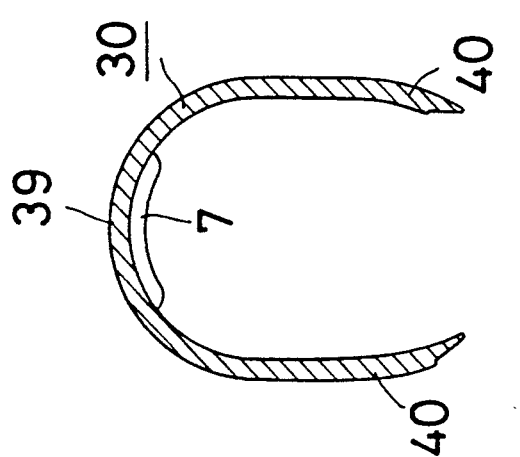
Figure 26:
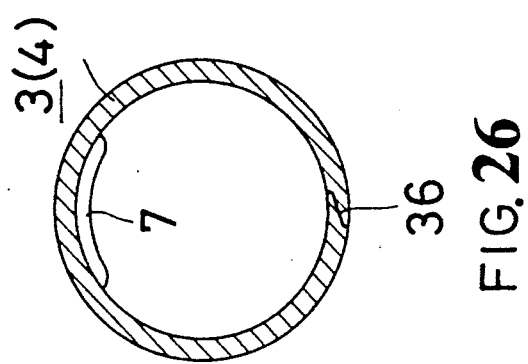

At a still further step, flat portions 40 extending outwardly from the opposite sides of the bulged portion 39 are forced towards each other to assume a reversed V-shape as a whole (see FIG. 24). After further forcing the flat portions 40 and 40 to be positioned closer to one another into a reversed U-shape (see FIG. 25), their opposite ends are caused to abut each other to form a header pipe (shown in FIG. 26) wherein the bulged portion 39 and the flat portions 40 constitute a single and smooth circle in cross section.

Finally, the trimming or adjusting of the cross-sectional shape may preferably be executed to give finished headers 3 and 4 of a predetermined dimension.

Although in the preceding embodiment separate raw strips 30 are used so that the respective strips are independently subjected one by one to the successive steps, it may be more preferable from the viewpoint of productivity that a single elongate brazing sheet 50 is employed to continuously perform all the steps including the preparation of the respective raw strips while the brazing sheet is being transported in an intermittent manner.

Figure 27:
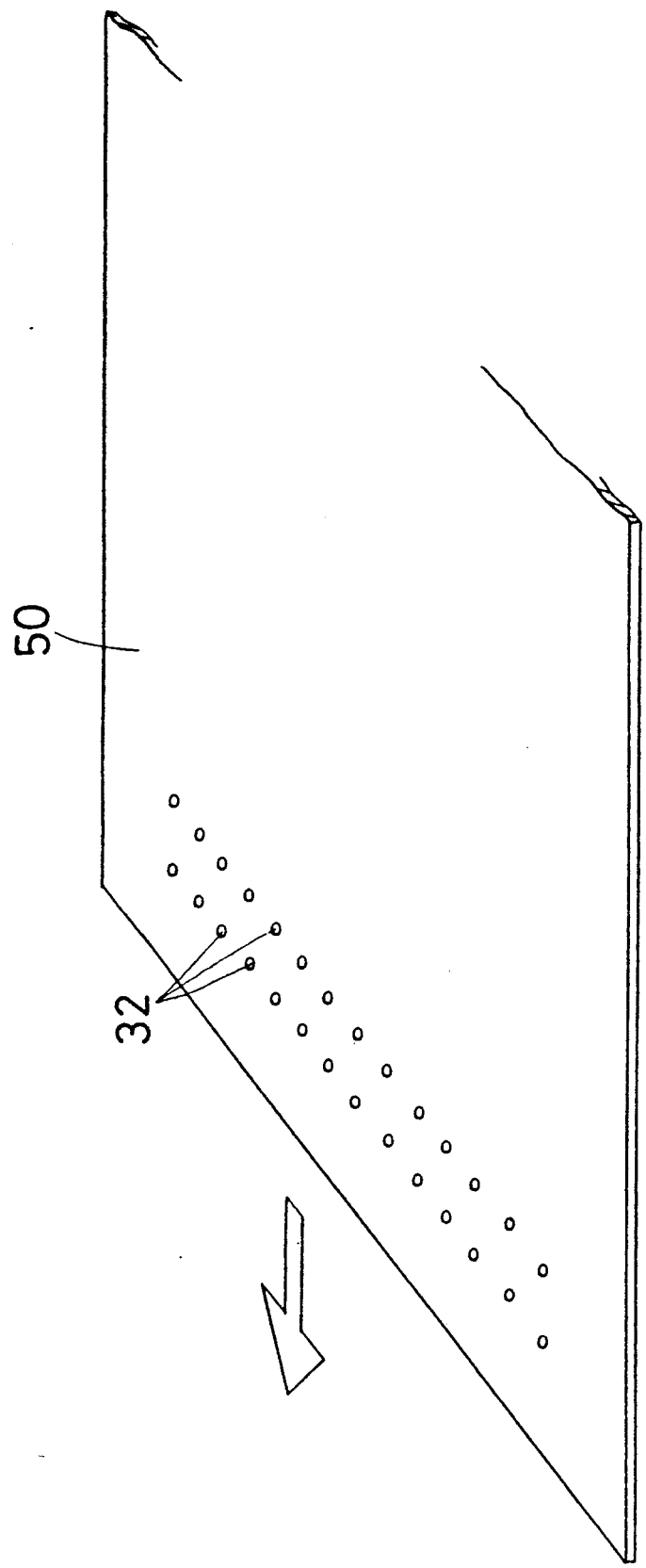

Therefore in this embodiment of the present invention, a leading region of the elongate brazing sheet 50 is subjected at first to the punching process to form a group of the swelled material-absorbing holes 32 as shown in FIG. 27, before the sheet advances a predetermined distance and is stopped there.

Figure 28:
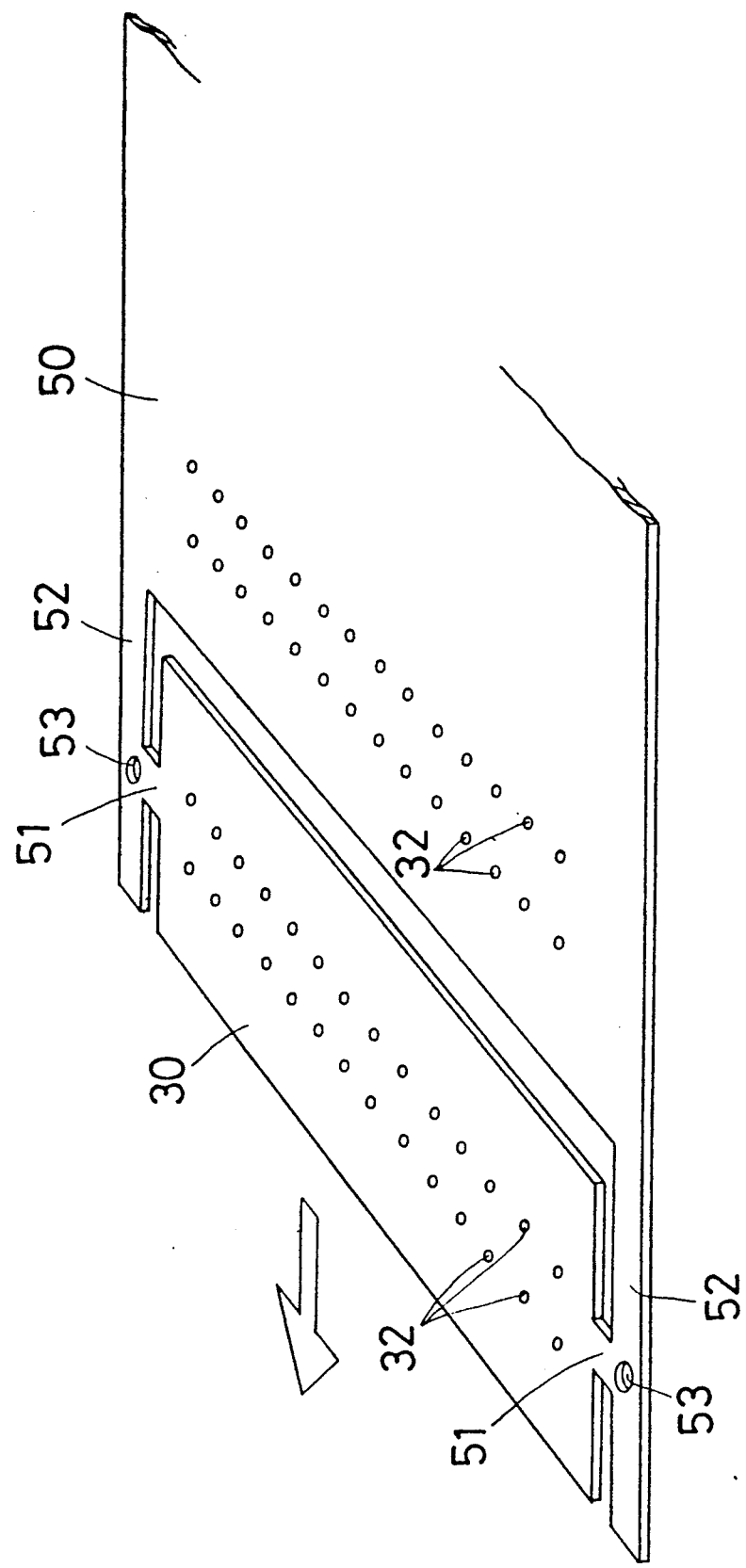

Then, the sheet's region around the group of said holes 32 are removed by the punching process so that a raw strip 30 is formed to extend transversely of the elongate sheet 50, as illustrated in FIG. 28. Ears 51 are formed at the same time at its longitudinal ends in such a state that common supporting bands 52 are also provided and connected to the ears so as to support the punched raw strip. Simultaneously with such a punching process for the leading strip 30, another group of swelled material-absorbing holes 32 for the succeeding strip are punched. The length and width of the raw strips may be given in accordance with the desired dimensions of the headers and other relevant members in the heat exchanger. The reference numeral 53 denotes bores formed through the supporting bands 52 at their positions adjacent to the ears 51, which bores 53 may engage with a driving mechanism for transporting the elongate sheet.

Figure 29:
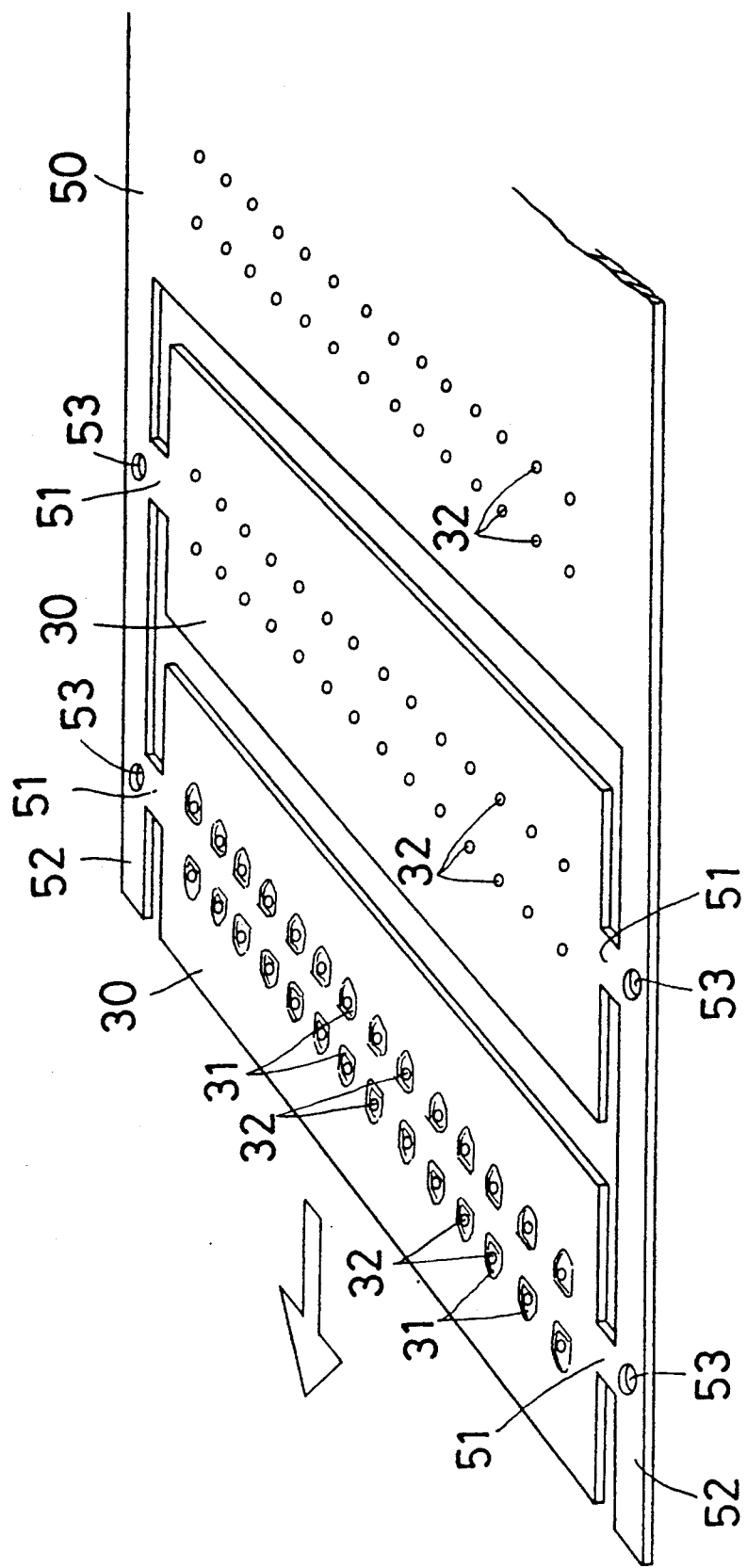

Subsequent to this step, the sheet is moved forward again the given distance and then stopped. While the recesses 31 are being embossed on the zones corresponding to the absorbing holes 32 within the leading strip 30 shown in FIG. 29, another raw strip 30 having the absorbing holes 32 will be formed on the sheet, with still another group of such holes 32 being also punched simultaneously for a third raw strip. This step will be repeated until a desired number of the raw strips are produced. The swelled material-absorbing holes 32 may however be formed after the individual raw strip 30 is punched at first. Alternatively, it may also be possible to emboss the recesses 31 each disposed around the hole 32 at first before the raw strip is formed.

Figure 30:
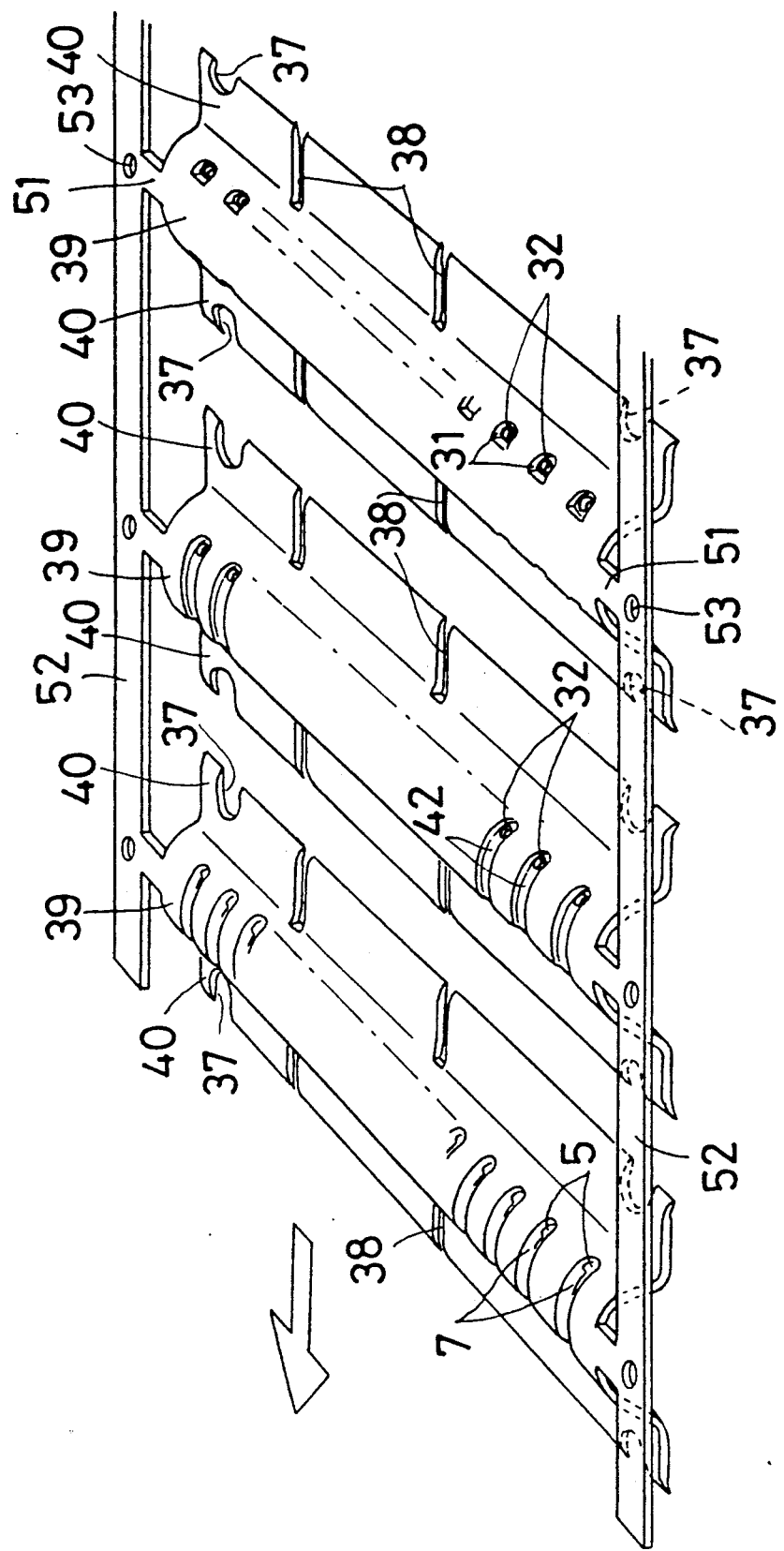
Figure 31:
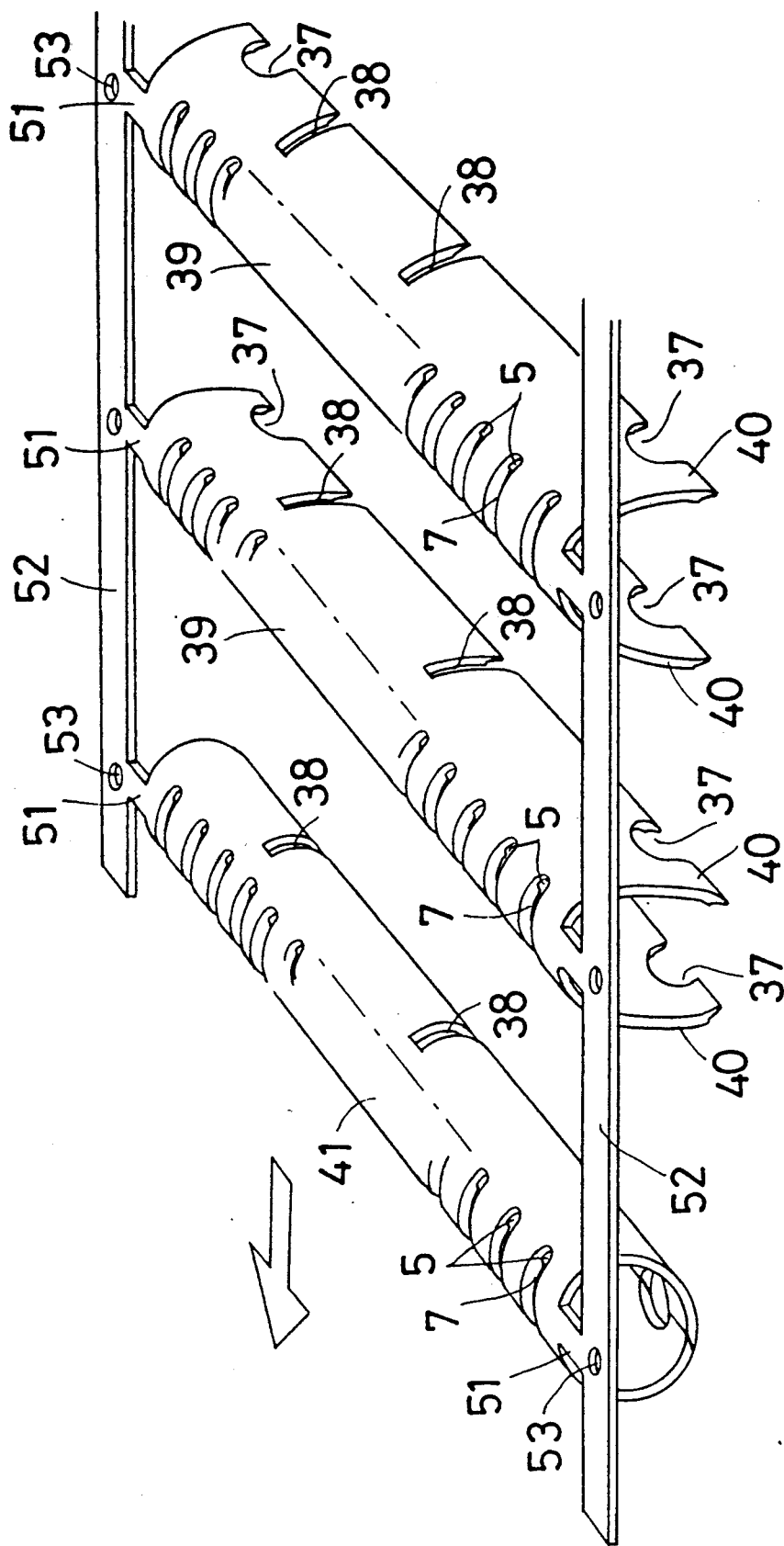
Figure 32:
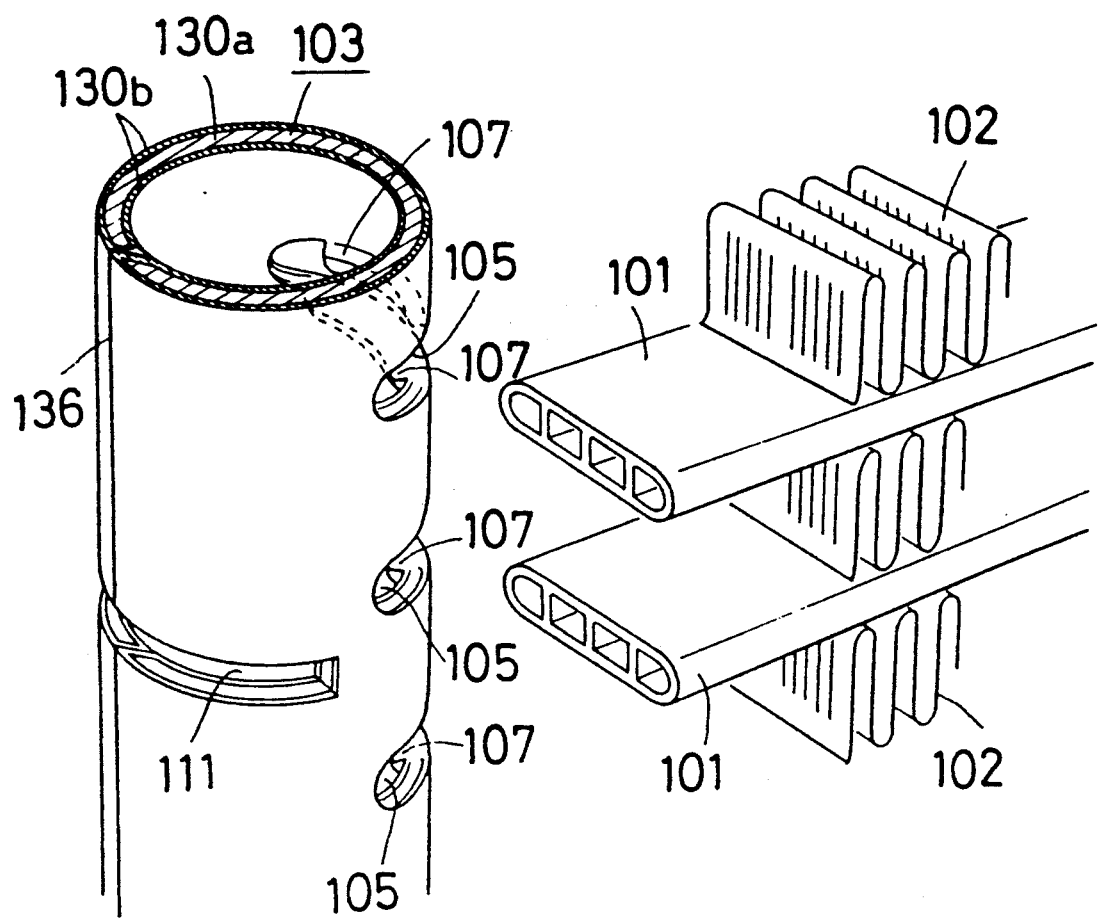
Figure 33A:
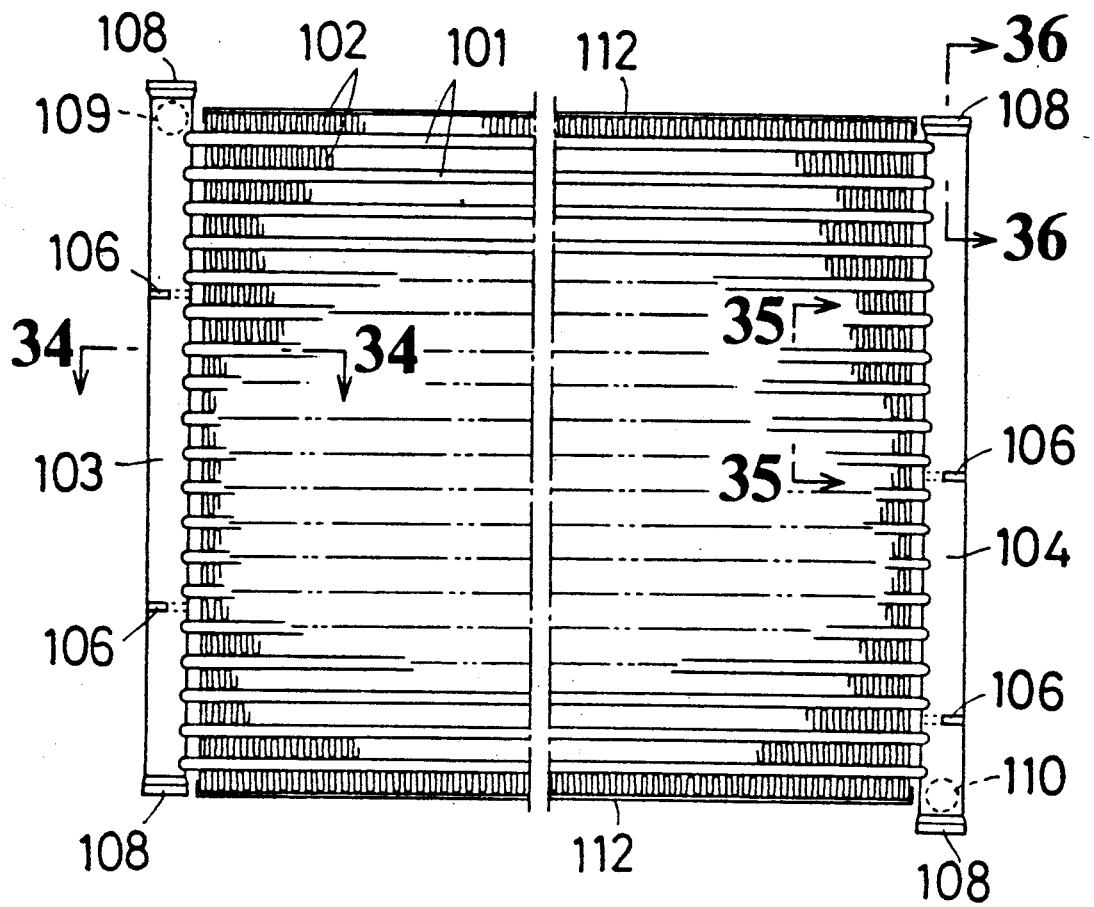
FIG. 33A is a front elevation of the heat exchanger shown in FIG. 32.
Figure 33B:
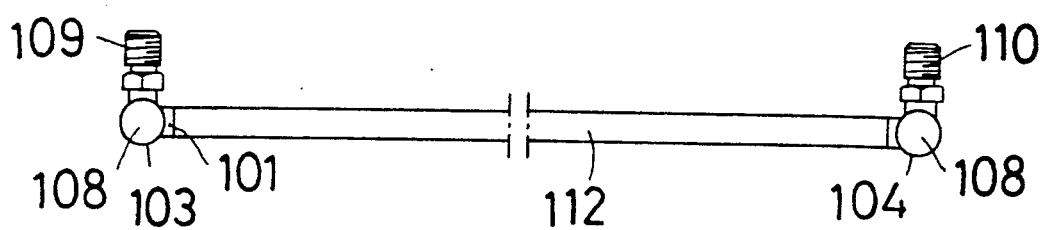
FIG. 33B is a plan view of the heat exchanger shown in FIG. 32.

In the described manner of producing the raw strips, they remain connected to the bands 52 by the ears 51 while being processed for the respective strips and while the elongate sheet being transported. Consequently, finished pipes 41 shown in FIG. 30 will remain connected to the common supporting bands 52 when they are discharged from this production line.

Therefore, the finished pipes 41 must be severed from the ears 51 to give separate pipes as the final products, i.e., finished header pipes.

Those separate pipes may be fed to an assembly line for heat exchangers, after being washed if necessary. Because the abutted side ends in each pipe will be adjoined firmly and tightly one to another as a result of the brazing process carried out on the assembly line, any welding process which has been compulsory for the conventional seam-welded pipes need not be added here.

The heat exchanger in the embodiments may be assembled in the following manner. Both ends of each flat tube 1 are inserted at first into the apertures 5 of the headers 3 and 4, wherein the lateral side portions of each tube 1 are guided by the guide surfaces 34 at both lateral edges of said aperture 5 so as to facilitate the initial insertion of the tubes. After the tip end has entered the aperture, the guide lugs 7 will further guide the tube so that it takes its correct position perpendicular to the header. After the tube is inserted completely, the guide lugs 7 will hinder it from undesirably rocking so that this temporarily assembled state is stabilized.

Each of the corrugated fins 2 which are also made of a brazing sheet is set in place between the adjacent tubes 1 and 1 or outside the outermost tubes. The partitions 6 are inserted in the headers through the slits 11, and side plates 12 are attached to outer surfaces of the outermost fins 2. A temporary assembly prepared in this manner will then be subjected to the so-called one-shot brazing process carried out for example within an oven. As shown in FIG. 3, sufficient fillets are built in the joint regions between each of the headers 3 and 4 and the inserted tubes 1, whereby they are fastened one to another without causing any vacant gap remaining unfilled between them. The outwardly tapered guide surfaces 34 at the lateral edges of the aperture will serve as the solder sinks to receive the molten brazing agent. Besides, guide lugs 7 will increase the brazed area between each tube 1 and the aperture 5, to thereby further strengthen their joints. At the same time, the abutments 36 present in the header pipes 3 and 4 are also joined and tightly closed by virtue of further fillets formed there. Additionally, the slanted ends of the raw strip 30 are of complementary shapes mating one another in the abutment 36, and are covered with the brazing substance layer 30b so that the strength of junction is further increased. The reference numeral 8 given in FIG. 2 denotes caps which close an upper and lower ends of each header 3 and 4. Those caps 8, which are of a short cylindrical shape as shown in FIG. 5, will be attached to the headers after the raw strip is rolled into the cylindrical shape but before subjected to the brazing process. Therefore, the caps 8 not only close the open ends of the headers, but also inhibit the abutment to open due to a high temperature during the brazing process. The further reference numerals 9 and 10 in FIG. 2 respectively denotes a coolant inlet and outlet, which are similarly brazed to the headers at the same time when the other members are brazed.

Although the tube-insertion apertures 5 have their major axis extending in the direction of the raw strip's 30 width, they may have it extending longitudinally of said raw strip.

In summary, according to the mode defined in the annexed claim 1, the inward swells are drawn at the zones where the tube-insertion apertures are successively punched, after the strip is bent in part transversely or longitudinally to form the bulged portion. At the following step to punch the elliptical apertures receiving the flat tubes, the inward swells are cut off from the bulged portion, wherein each swell's opposite edges extending along the major axis of said swell will remain unpunched. Thus, the remaining edges form the guide lugs after said apertures are directly punched through the inward swells. This feature is advantageous in that the prior art raw or unfinished apertures, each having the protrusions to be deformed into the guide lugs, need not be prepared herein, whereby the punching die of complicated three-dimensional shape can now be dispensed with. The punching die (not shown) used in the method of the present invention may be of so simple a shape that it can be formed easily and its cutting blades are less likely to be damaged or worn away in a short time. Because the object to be punched is not any finished cylindrical pipe but the arc-shaped bulged portion in the invention, any suitable anvil of the corresponding shape can be used to support the bulged portion while it is being punched. This eliminates the problem that the pipe wall has often been collapsed or deformed in the prior art method.

In the case wherein the thin recesses are previously embossed at the zones corresponding to the lateral ends of each of the tube-insertion apertures before the pressing and punching steps, these apertures can be punched through the recesses so smoothly that any flashes hindering the smooth insertion of the flat tubes are less likely to be produced around each aperture.

Further, the previously embossed recesses on the raw strip zones subsequently forming the side edges of each tube-insertion aperture are of a thickness smaller than the strip, so that they can be cut readily without producing at said edges any flashes which might hinder the flat tube from being smoothly inserted in the aperture.

According to the other modes defined in the annexed claims 3 and 4, all the steps including the first step of preparing the raw strip and the final step of separating the finished pipes from one another are executed sequentially while the single elongate brazing sheet is being transported longitudinally in an intermittent manner. This feature is advantageous in that the metal pipes each having apertures formed with guide lugs can be manufactured continuously at an improved productivity, thus enabling a full automation of the manufacture process.

According to the modification as set forth in the annexed claim 5, the swelled material-absorbing holes are previously formed through the raw strip at its zones where the recesses are to be embossed subsequently. This feature is also advantageous in that the embossed material can be absorbed in the hole when the recesses are embossed, whereby the embossing pressure will not cause any swelling of the raw strip around each recess. Thus, any irregularity in thickness or any flashes are not produced around each tube-insertion aperture.

Second Embodiment

A second embodiment will now be described referring at first to FIGS. 32 to 36, wherein a header pipe is manufactured for use in an aluminum (or its alloy) heat exchanger which may be employed as a condenser in the car cooler system.

In FIGS. 32 to 36, a plurality of flat tubes 101 extend horizontal and are stacked one above another in the vertical direction, with corrugated fins 102 each being interposed between two adjacent tubes 101. This heat exchanger further comprises a pair of right and left aluminum headers 103 and 104 of a circular cross-sectional shape, each header being a brazeable pipe which is produced according to the method provided by the invention.

The headers 103 and 104 are manufactured in the following manner.

Figure 41:
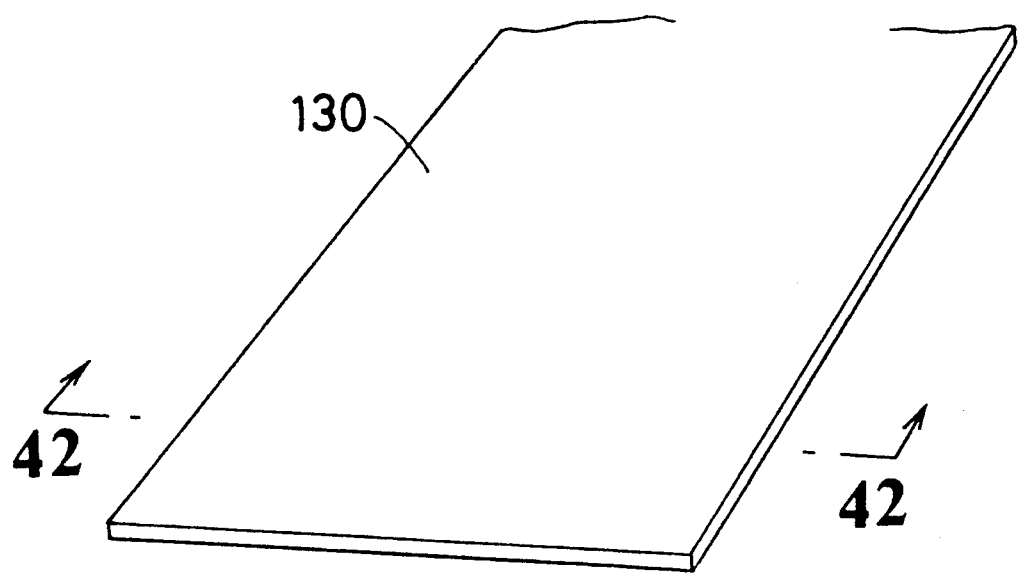
Figure 42:
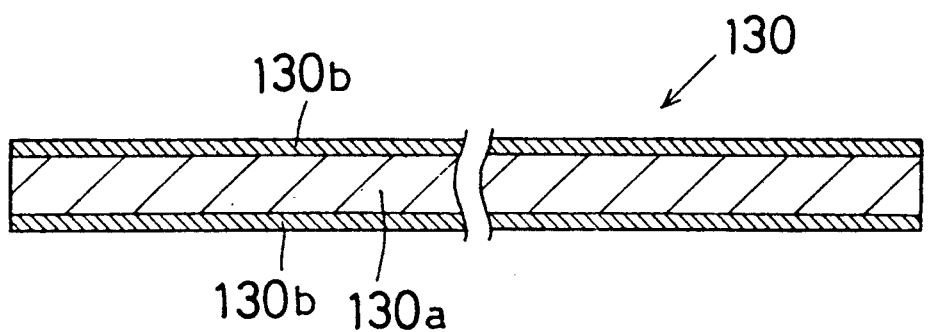

As shown in FIGS. 41 and 42, a raw strip 130 is prepared at first, which strip comprises an aluminum core sheet 130a having both surfaces covered with a brazing substance layer 130b. The brazing substance layer 130b may generally be an alloy of Al-Si series which contains about 6-13% by weight of Si.

Figure 43:
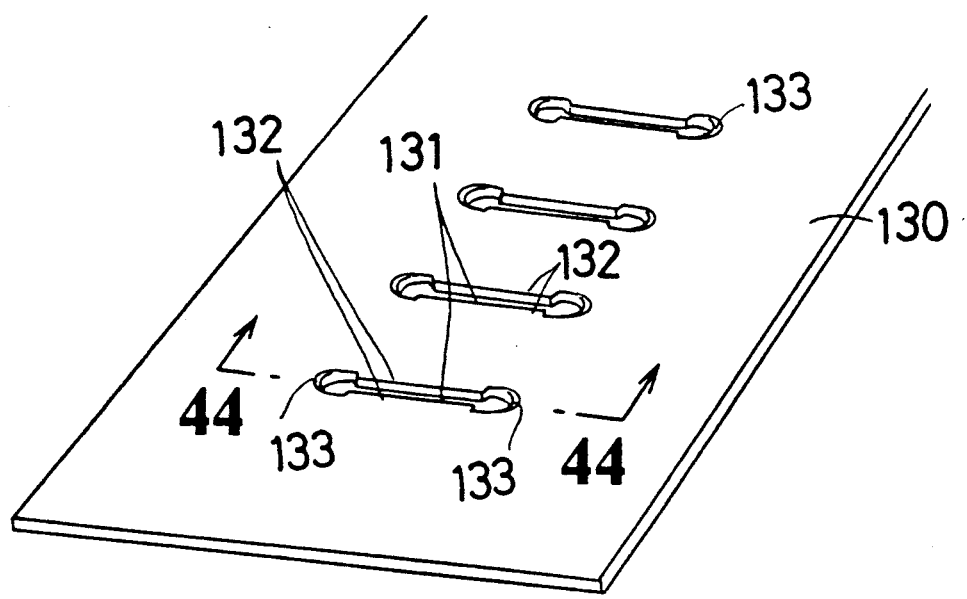

Next, the punching of the raw strip 130 is carried out to form raw apertures 131 arranged at regular intervals and longitudinally of the raw strip as shown in FIG. 43. Those raw apertures 131 are each arranged transversely of the raw strip and at an intermediate region between the lateral sides of the raw strip 130. The raw or unfinished apertures 131, which will become later the tube-insertion apertures 105 of an elliptical shape, are punched such that their edges located at ends of the minor axis will remain unpunched to provide protrusions 132 which become the guide lugs 107 in the finished apertures.

Figure 37:
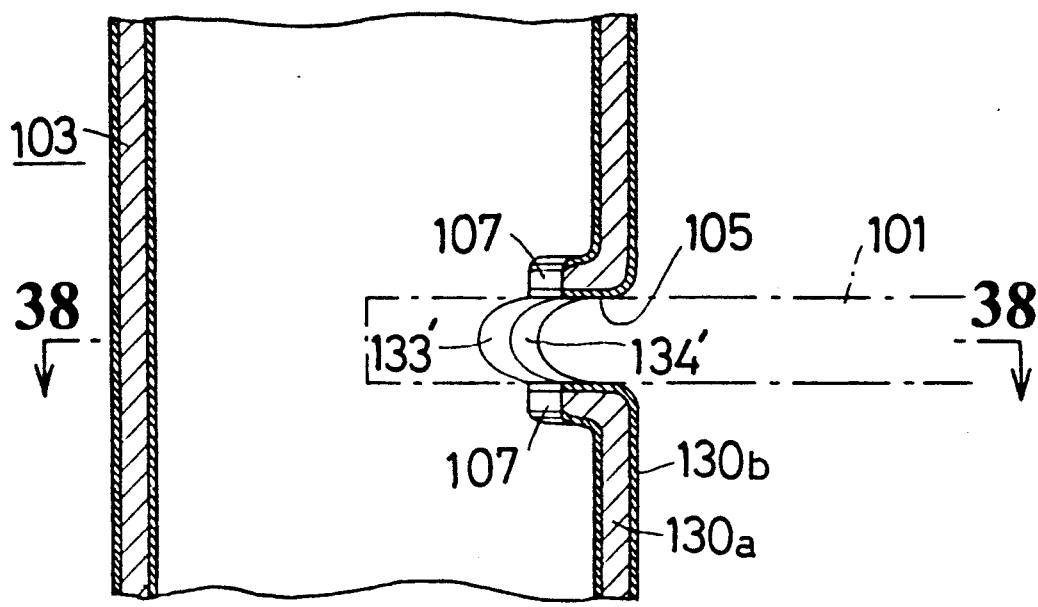
Figure 38:
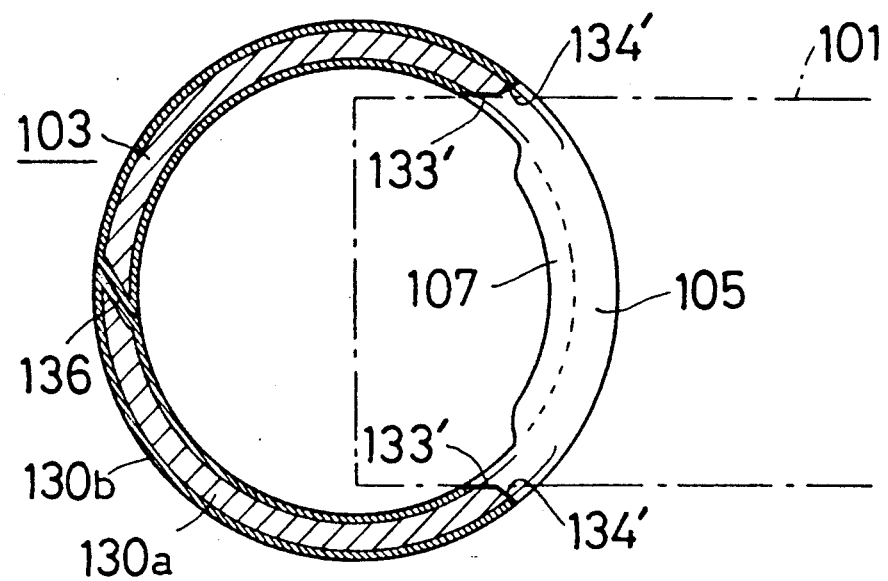
Figure 39:
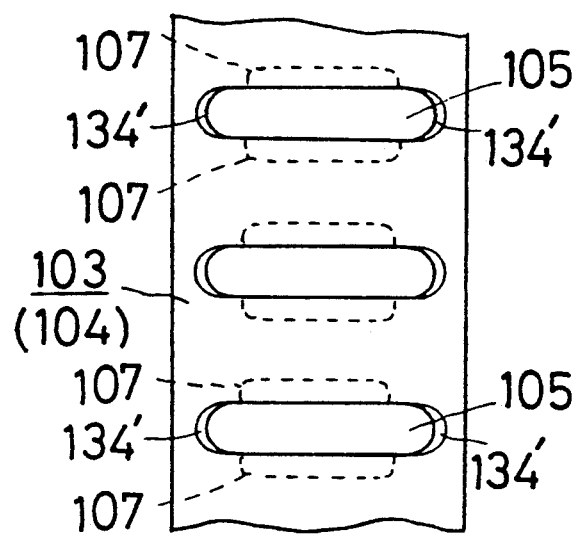
Figure 40:
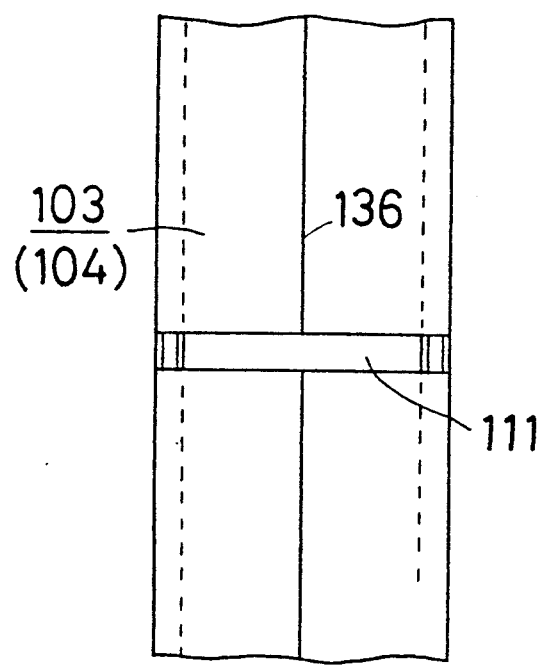
Figure 44:
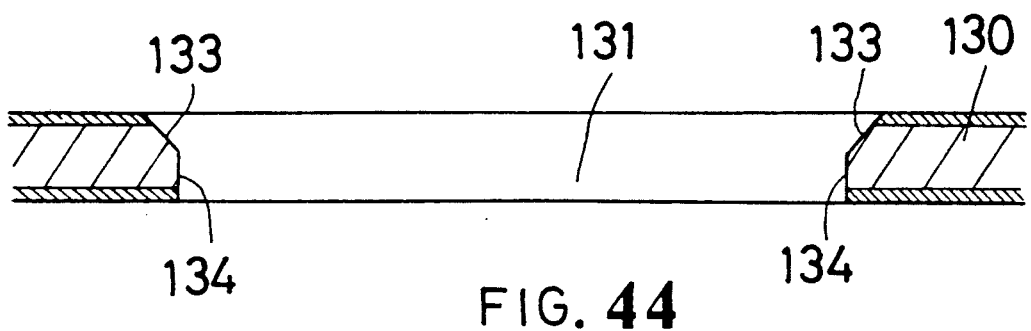

Since the raw apertures 131 are punched before the raw strip 130 is bent, the punching die need not be of a three-dimensional shape in side-elevational view, but a two-dimensional shape suffices Each raw aperture 131, which pierces the raw strip 130 and is perpendicular thereto, is pressed at its one corners located at ends of the major axis of said aperture Thus, tapered surfaces 133 are formed to extend from a mid point in the direction of thickness to one of outer surfaces of raw strip, as shown in FIG. 44. The tapered surfaces 133 will be disposed in parallel with one another, and also in parallel with the flat tube 101 which will be inserted in the aperture 105. In more detail, the angle of the tapered surfaces 133 is such that the outer surfaces of lateral ends of each flat tube 101 come into close contact with the surfaces 133 as shown in FIGS. 37 and 38, whereby no gap is left between them to impair the strength of brazed connection.

Other corners at the ends of major axis of the raw aperture 131 are perpendicular to the surface of the raw strip and thus provide upright surfaces 134 shown in FIG. 44. Those upright surfaces, which extend from the mid point in the direction of thickness to the other outer surface of raw strip, will be opened outwardly to facilitate the insertion of the flat tube 101 as shown in FIG. 38.

Figure 45:
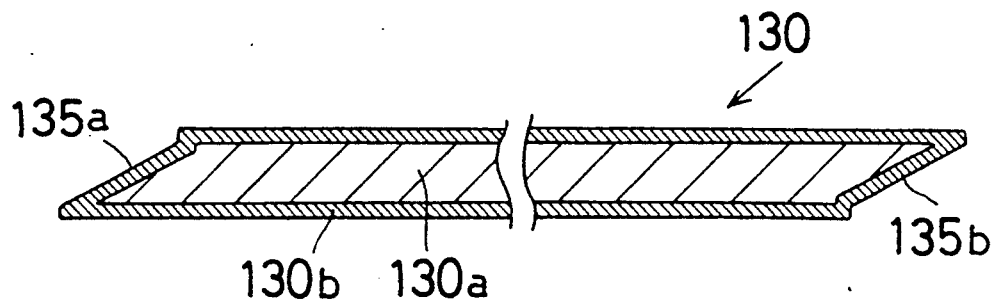

At the next step, lateral ends of the raw strip 130 is pressed in the direction of its thickness. This pressing of lateral ends is effected in opposite directions, i.e., upwardly for one of the lateral ends and downwardly for the other lateral end. Thus, as shown in FIG. 45, one of the thus chamfered ends 135a becomes thinner from its lower edge towards its upper edge, while the other slanted end 135b becomes thinner contrarily from its upper edge towards its lower edge. Both the slanted ends are covered with the brazing substance layer 130b. Such slanted ends 135a and 135b will abut one another as shown in FIG. 38 so as to provide an abutment 136. Due to the presence of said brazing substance layer in the abutment, a liquid-tight and strong junction of the mating ends is ensured after the brazing process is conducted.

Figure 46:
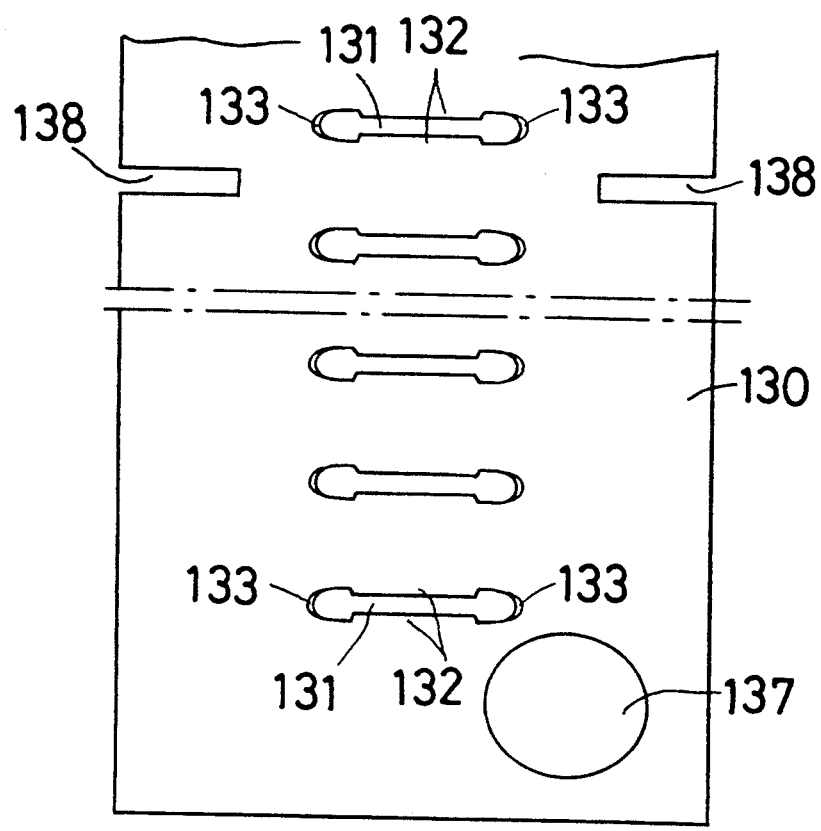

Subsequently, a cutout 137 for connecting a coolant inlet or outlet is punched at an appropriate zone of the strip 130, as shown in FIG. 46. Slits 138 similarly punched at opposite zones of said strip will be coupled with one another to provide an integral opening or slit 111, into which a partition 106 of the heat exchanger shown in FIG. 33A will be inserted and secured. The partition 106 causes the coolant to flow in a meandering manner within the heat exchanger.

Figure 47:
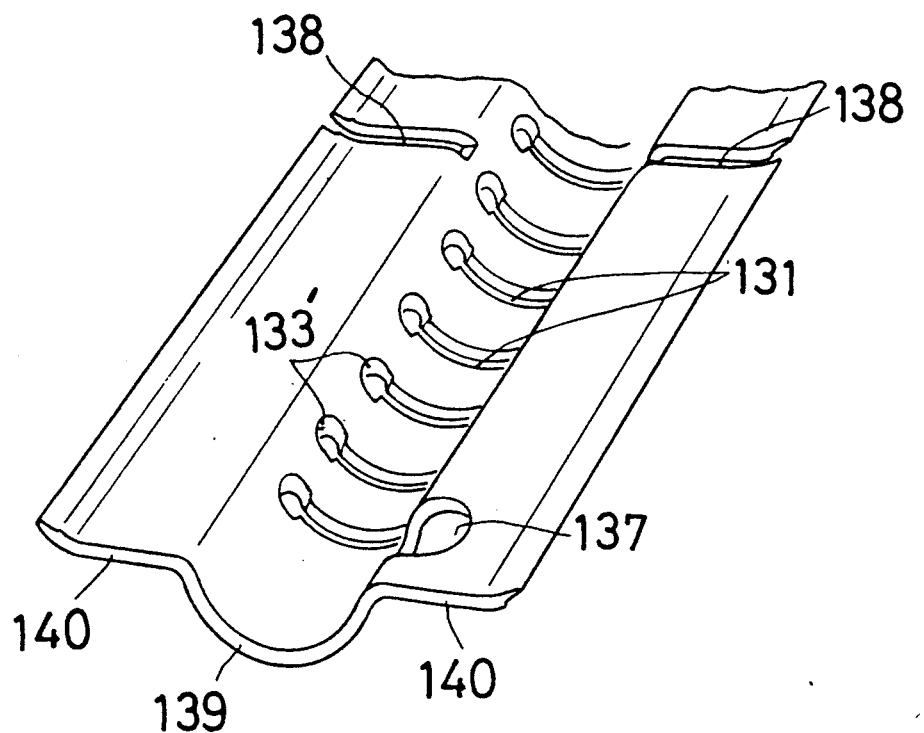

At a further step shown in FIG. 47, the pressing or like process is carried out so that the raw strip 130 is bent to become arc-shaped in cross section at its middle region including all of the already punched apertures 131. A bulged portion 139 of a hat-like shape in cross section is thus provided, and the apertures 131 are disposed on an outer surface of the hat-like bulged portion. At a still further step shown in FIG. 48, flat portions 140 extending outwardly from the opposite sides of the bulged portion 139 are forced towards each other to assume a V-shape as a whole. The bending of the raw strip to form the bulged portion 139 is executed in such a manner that the tapered surfaces 133 at the ends of major axis are located inwardly, with the upright surfaces 134 being located outwardly. As a result, the tapered surfaces 133 become parallel with the flat tube which will be inserted later, and the upright surfaces 134 become the guide surfaces 134' tapered towards outside (see FIG. 38).

At the subsequent step shown in FIGS. 49A and 49B, the bending process is carried out for the apertures 131, so as to bend the protrusions 132 inwardly of the bulged portion 139. In detail, a chisel or any other similar tool may be applied to the outer surface of the bulged portion, so that each tube-insertion aperture 105 comprises the guide lugs 107 protruding inwardly in the direction in which the inserted flat tube extend.

After further forcing the flat portions 140 and 140 to be positioned nearer one another into a U-shape (see FIG. 50), their opposite ends are caused to abut one another to form a header pipe (shown in FIG. 51) wherein the bulged portion 139 and the flat portions 140 constitute a single and smooth circle in cross section.

Finally, the trimming or adjusting of the cross-sectional shape may preferably be executed to give finished headers 103 and 104 of a predetermined dimension.

Although in the preceding embodiment separate raw strips 130 are used so that the respective strips are independently subjected to the successive steps, it may be more preferable from the viewpoint of productivity that a single elongate brazing sheet 150 is employed to continuously perform all the steps including the preparation of the respective raw strips while the brazing sheet is being transported in an intermittent manner.

Figure 52:
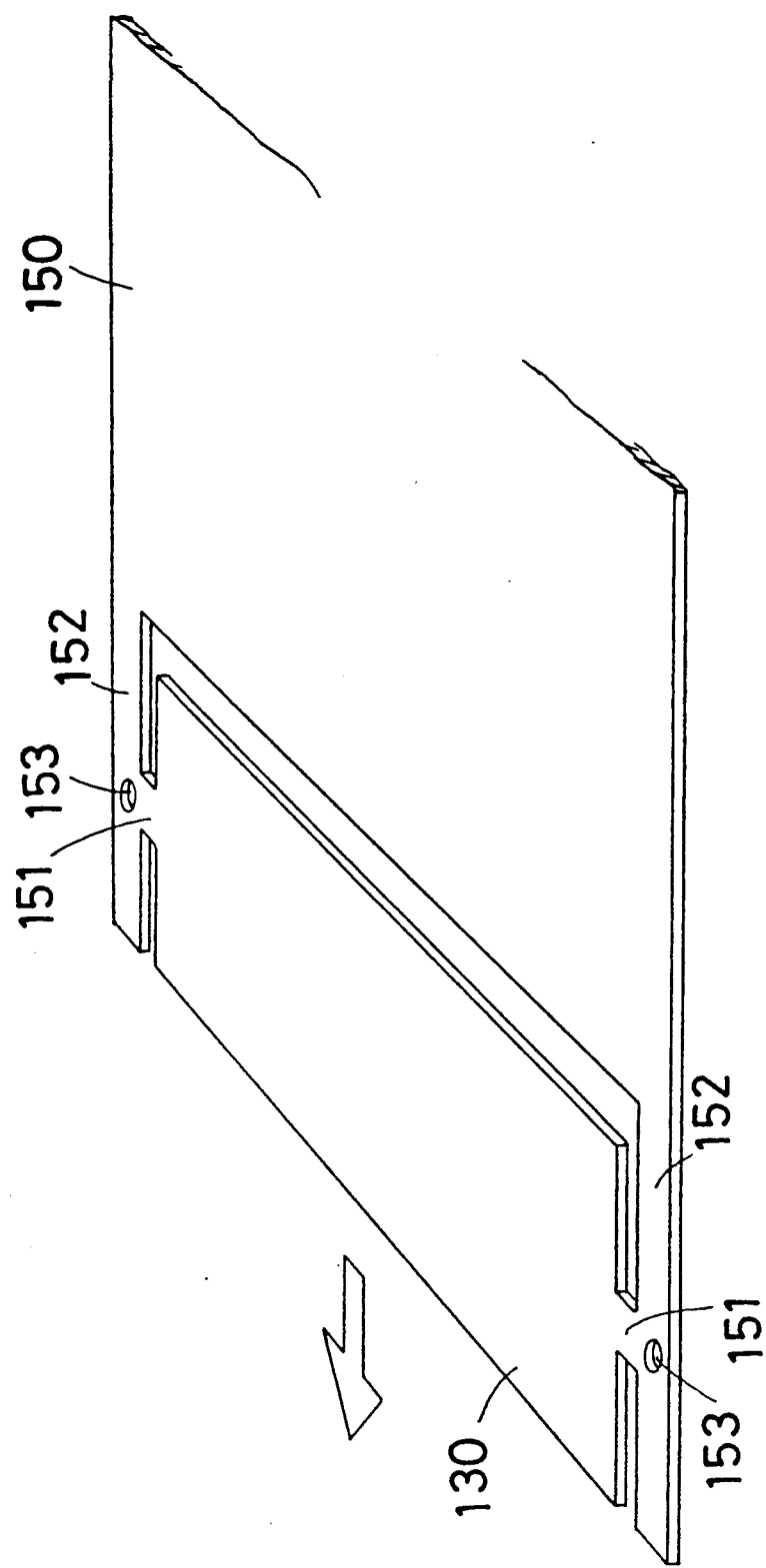

Therefore in a second embodiment, a leading region of the elongate brazing sheet 150 is subjected at first to the punching process to remove unnecessary zones to thereby provide a raw strip 130 which extends transversely of the elongate sheet 150, as illustrated in FIG. 52. Ears 151 are formed at the same time at its longitudinal ends in such a state that common supporting bands 152 are also provided and connected to the ears so as to support the punched raw strip. The reference numeral 153 denotes bores formed through the supporting bands 152 at their positions adjacent to the ears 151, which bores 153 may engage with a driving mechanism used to transport the elongate sheet.

Figure 53:
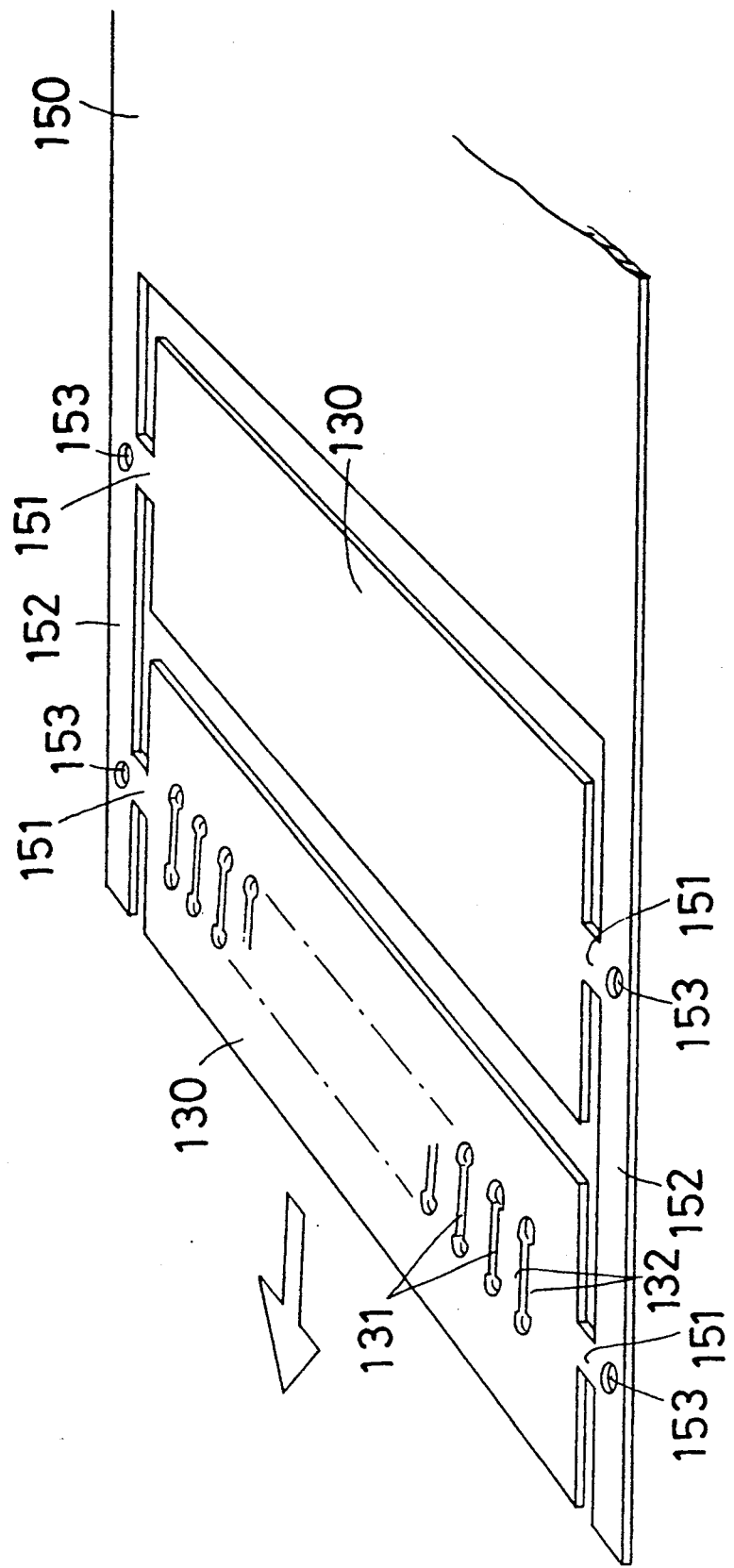

Subsequent to this step, the brazing sheet 150 is moved forward a given distance and then stopped. The raw apertures 131, which will become later the tube-insertion apertures 105, are punched through the leading raw strip 130 shown in FIG. 53 while at the same time another raw strip 130 is formed.

The brazing sheet 150 will be transported again the given distance and stopped thereafter, so that the the edges of the apertures are pressed to produce the tapered surfaces 133 for the leading strip 130 while the raw apertures 131 are punched for a second or succeeding strip 130 and simultaneously a third strip is formed to follow the second one. This step will be repeated until a desired number of the raw strips are produced. The order of the above-described steps may be altered if necessary. For example, the punching of the raw apertures may precede the forming of the raw strip, or the punching and succeeding chamfering of the raw apertures may precede the forming of the raw strip.

Figure 54:
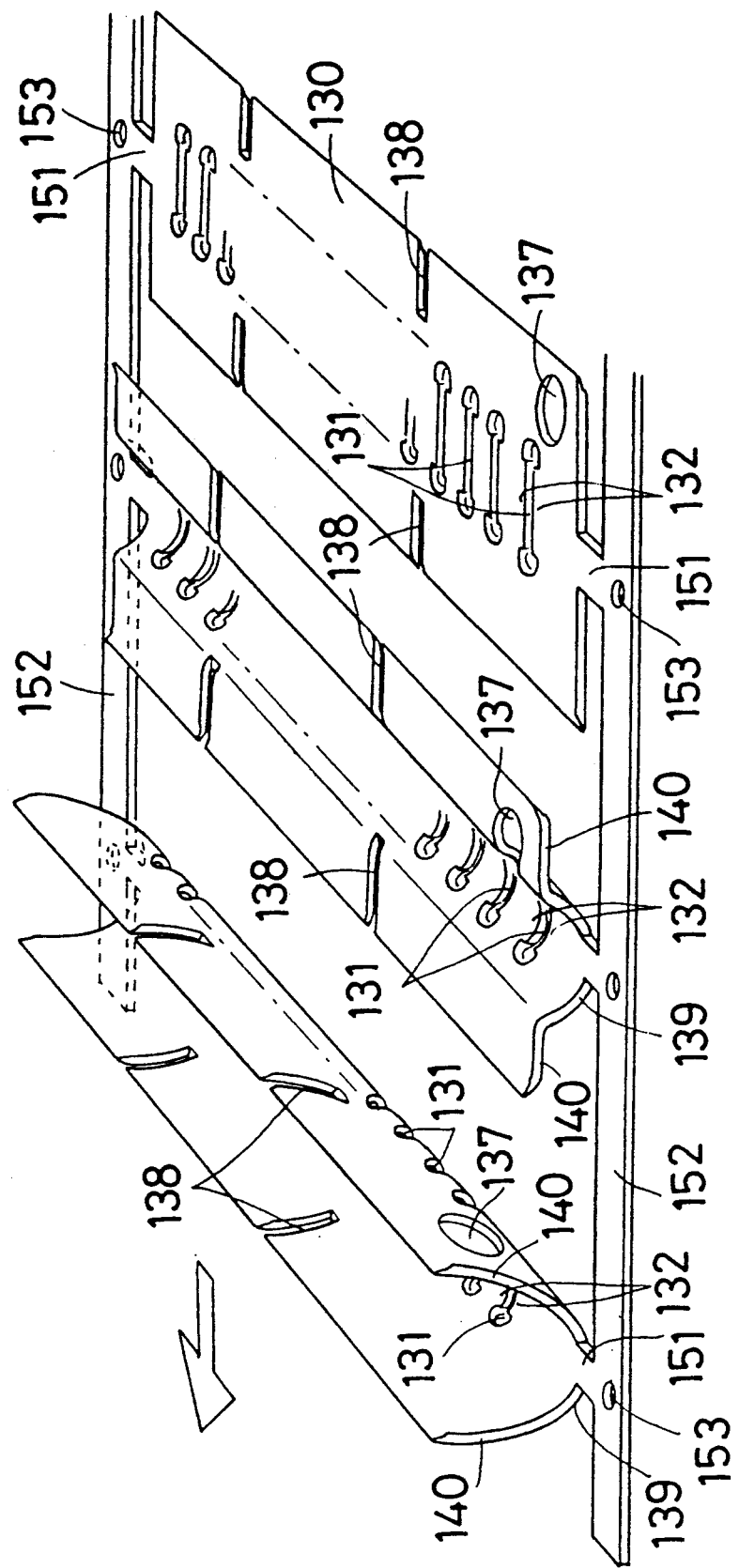
Figure 55:
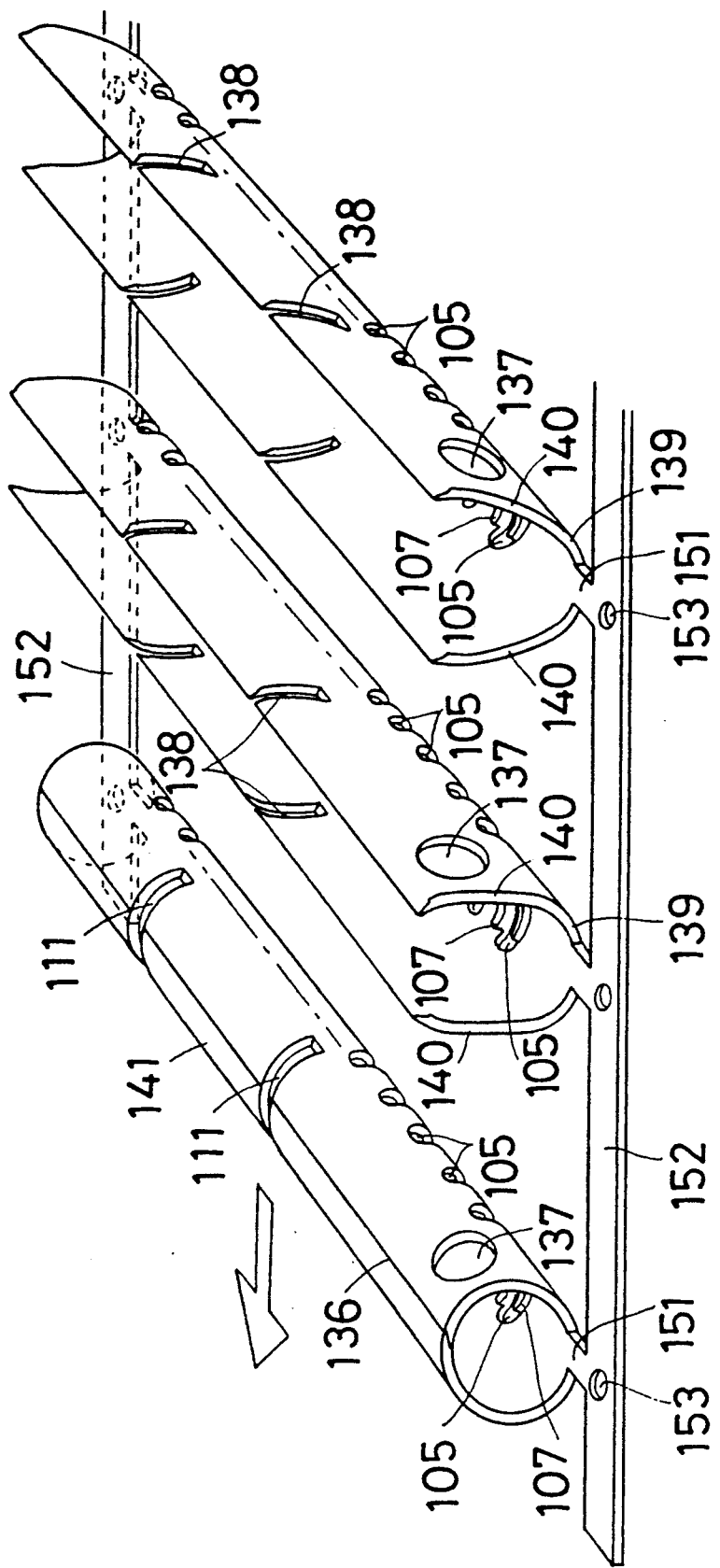

In the described manner of producing the pipes, the raw strips remain connected to the bands 152 by the ears 151 while the successive steps are being carried out. Thus, finished pipes 141 shown in FIG. 54 will also be connected to the bands when they are discharged from this production line.

Therefore, the finished pipes 141 must be severed from the ears 151 to give separate pipes as the final products, i.e., finished header pipes.

Those separate pipes may be fed to an assembly line for heat exchangers, after being washed if necessary. Because the side ends in the abutment 136 of each pipe will be adjoined firmly and tightly one to another as a result of the brazing process which is carried out on the assembly line, any welding process which has been compulsory for the conventional seam-welded pipes need not be added here.

The heat exchanger shown in FIGS. 32 to 35 may be assembled in the following manner in the embodiments.

Both ends of each flat tube 101 are inserted at first into the apertures 105 of the headers 103 and 104, wherein the lateral side portions of each tube 101 are guided by the guide surfaces 134' at both lateral edges of said aperture 105, and immediately after that, the thus inserted ends of the tube are controlled by the parallel surfaces 133' so as to facilitate the initial insertion of the tubes. After the tip end has entered the aperture, the guide lugs 107 will further guide the tube, and hold it in a correct position perpendicular to the header, lest it should undesirably rock in the vertical direction.

Each of the corrugated fins 102 which are also made of a brazing sheet is set in place between the adjacent tubes 101 or outside the outermost tubes. The partitions 106 are inserted into the headers through the slits 111, and side plates 112 are attached to outer surfaces of the outermost fins 102. A temporary assembly prepared in this manner will then be subjected to the so-called one-shot brazing process, for example, within an oven.

As shown in FIG. 34, sufficient fillets are built in the joint regions between each of the headers 103 and 104 and the inserted tubes 101, whereby they are rigidly consolidated with one another, without any vacant gap remaining unfilled between them. The outwardly tapered guide surfaces 134' on the lateral edges of the aperture serve as the solder sinks to receive the molten brazing agent. Besides, guide lugs 107, with their outer brazing substance layer 130b intact, increase the brazed area between each tube 101 and the aperture, to thereby strengthen the joints. At the same time, the abutments 136 present in the header pipes 103 and 104 are also joined and tightly closed by virtue of further fillets formed there. Additionally, the slanted ends of the raw strip 130 are of complementary shapes mating one another in the abutment 136 as shown in FIG. 34, and are covered with the brazing substance layer 130b so that the strength of junction is further increased. The reference numeral 108 in FIG. 33A denotes caps closing an upper and lower ends of each header 103 and 104. Those caps 108, which are of a short cylindrical shape as shown in FIG. 36, will be attached to the headers after the raw strip is rolled into the cylindrical shape but before brazed. Therefore, the caps 108 not only close the open ends of the headers, but also inhibit the abutment to open due to a high temperature during the brazing process. The further reference numerals 109 and 110 in FIG. 33A respectively denotes a coolant inlet and outlet, which are similarly brazed to the headers at the same time when the other members are brazed one to another.

Although the tube-insertion apertures 105 have their major axis extending in the direction of the raw strip's 130 width, they may have their major axis extending longitudinally of said raw strip.

In summary, according to the mode defined in the annexed claim 12, the brazeable metal pipe having the tube-insertion apertures of an elliptical shape and each having the guide lugs extending in parallel with the inserted flat tube and from at least one of the opposite peripheral edges defining therebetween the minor axis, is produced by forming through the raw strip the raw unfinished apertures integral with the protrusions which will become the guide lugs in the finished pipe, before bending the middle region of the raw strip transversely or longitudinally thereof so as to form the bulged portion arc-shaped in cross section. Therefore, the present method can be carried out by means of a punching die of a simpler structure than in the prior art method in which the raw apertures are punched after the raw strip is bent. Such a simpler die can be manufactured easily and is less likely to be damaged or worn away in a short time. Also, due to the the punching of raw apertures prior to the bending, the pipe wall is well protected from being collapsed or deformed.

Since the already bent bulged portion is subjected to the bending process for forming the guide lugs, there is no possibility that the guide lugs would act as any "ribs" which might hinder the raw strip from being bent smoothly without causing any undesirable deformation of the pipe wall.

According to the other mode defined in the annexed claim 13, all the steps including the first step of preparing the raw strip and the final step of separating the finished pipes from one another are executed sequentially while the single elongate brazing sheet is being transported longitudinally in an intermittent manner. This feature is advantageous in that the metal pipes each having apertures formed with guide lugs can be manufactured continuously at an improved productivity, thus enabling a full automation of the manufacture process.

According to the modification as set forth in the claim 14, the inner corners of opposite edges located at the ends of major axis of the raw aperture are chamfered to provide the tapered surfaces which will become parallel with the flat tubes inserted in the apertures of finished pipe. The outer corners of the opposite edges provide upright surfaces which will form the slanted surfaces in the finished pipe so that they extend half a thickness of the pipe wall and guide the inserted ends of flat tubes. The lateral edge portions of said tubes are guided by the slanted surfaces of the aperture, and further the position of said edge portions is controlled by the parallel surfaces of said aperture, so that the flat tubes can be inserted smoothly to take their correct position, thus rendering easier the assembly of the heat exchangers which employ the brazeable pipes provided by the present invention.

What is claimed is:

1. A method of making a brazeable metal pipe having a plurality of tube-insertion apertures of an elliptical shape and also having guide lugs formed integral with and extending from at least one of the opposite peripheral edges defining therebetween the minor axis of the elliptical aperture, with the guide lugs extending in parallel with the direction of insertion of flat tubes into the aperture, comprises the steps of:

bending a region of the raw strip transversely or longitudinally thereof so as to form a bulged portion arc-shaped in cross section and connected to at least one unbulged flat portions, with the raw strip being a brazing sheet comprising a core sheet which has either or both surfaces covered with a brazing substance layer;

thereafter pressing predetermined zones of the bulged portion in the direction of its thickness so as to form inward swells, the predetermined zones being at locations where the tube-insertion apertures are to be punched later;

subsequently punching each inward swell to form the tube-insertion aperture of an elliptical shape in such a manner that at least one of opposite edges facing one another in the direction of the minor axis of the elliptical aperture remains unpunched; and finally bending the at least one unbulged portions of the raw strip so that their side edges abut each other to form the cylindrical pipe.

2. A method of making a brazeable metal pipe having a plurality of tube-insertion apertures of an elliptical shape and also having guide lugs formed integral with and extending from at least one of the opposite peripheral edges defining therebetween the minor axis of the elliptical aperture, with the guide lugs extending in parallel with the direction of insertion of flat tubes into the aperture, the method comprising the steps of:

embossing predetermined small zones of a raw strip to form at least one pair of recesses of a smaller thickness than the raw strip, the raw strip being a brazing sheet comprising a core sheet which has either or both surfaces covered with a brazing substance layer, and the small zones being located where side ends of each aperture are to be formed later;

then bending a region of the raw strip transversely or longitudinally thereof so as to form a bulged portion arc-shaped in cross section and connected to at least one unbulged flat portions, with the bulged portion including the recesses;

thereafter pressing an intermediate zone between the recesses of the bulged portion in the direction of its thickness so as to form an inward swell for each pair of the recesses;

subsequently punching the recesses and the inward swell to form each tube-insertion aperture of elliptical shape in such a manner that at least one of opposite edges facing one another in the direction of the minor axis of the elliptical aperture remains unpunched; and finally bending the at least one unbulged portions of the raw strip so that their side edges abut each other to form the cylindrical pipe.

3. A method of making a brazeable metal pipe having a plurality of tube insertion apertures of an elliptical shape and also having guide lugs formed integral with and extending from at least one of the opposite peripheral edges defining therebetween the minor axis of the elliptical aperture, with the guide lugs extending in parallel with the direction of insertion of flat tubes into the aperture, the method comprising the steps of:

preliminarily forming a plurality of raw strips by removing unnecessary portions from a brazing sheet comprising a core sheet which has either or both surfaces covered with a brazing substance layer, so that the raw strips are connected to each other by ears which extend from longitudinal or transverse opposite sides of said raw strips and are integral with common outer supporting bands;

then bending a region of the raw strip transversely or longitudinally thereof so as to form a bulged portion arc-shaped in cross section;

thereafter pressing predetermined zones of the bulged portion in the direction of its thickness so as to form inward swells, the predetermined zones being at locations where the tube-insertion apertures are to be punched later;

subsequently punching each inward swell to form the tube-insertion aperture of an elliptical shape in such a manner that at least one of opposite edges facing one another in the direction of the minor axis of the elliptical aperture remains unpunched;

further bending the at least one unbulged flat portions of the raw strip so that their side edges abut each other to form each of the cylindrical pipes which are connected one to another through the respective ears and by the common supporting bands; and finally separating each pipe from the common supporting bands, wherein these steps are carried out continuously while the elongate brazing sheet is transported longitudinally.

4. A method of making a brazeable metal pipe having a plurality of tube-insertion apertures of an elliptical shape and also having guide lugs formed integral with and extending from at least one of the opposite peripheral edges defining therebetween the minor axis of the elliptical aperture, with the guide lugs extending in parallel with the direction of insertion of flat tubes into the aperture, the method comprising the steps of:

preliminarily forming a plurality of raw strips by removing unnecessary portions from a brazing sheet comprising a core sheet which has either or both surfaces covered with a brazing substance layer, so that the raw strips are connected to each other by ears which extend from longitudinal or transverse opposite sides of said raw strips and are integral with common outer supporting bands;

embossing predetermined small zones of the brazing sheet or of the raw strip to form at least one pair of recesses of a smaller thickness than the raw strip, the small zones being located where side ends of each aperture are to be formed later;

then bending a region of the raw strip transversely or longitudinally thereof so as to form a bulged portion arc-shaped in cross section and connected at least one unbulged flat portions, with the bulged portion including the recesses;

thereafter pressing an intermediate zone between the recesses of the bulged portion in the direction of its thickness so as to form an inward swell for each pair of the recesses;

subsequently punching the recesses and the inward swell to form each tube-insertion aperture of elliptical shape in such a manner that at least one of opposite edges facing one another in the direction of the minor axis of the elliptical aperture remains unpunched;

further bending the at least one unbulged portions of the raw strip so that their side edges abut each other to form each of the cylindrical pipes which are connected one to another through the respective ears and by the common supporting bands; and finally separating each pipe from the common supporting bands, wherein these steps are carried out continuously while the elongate brazing sheet is transported longitudinally.

5. The method as defined in claim 2 or 4, wherein a swelled material-absorbing hole is formed through the raw strip at the zone thereof where each of the recesses is formed subsequently.

6. The method as defined in claim 1, 2, 3 or 4, wherein the guide lugs are formed at both the opposite peripheral edges defining the minor axis of each tube-insertion aperture.

7. The method as defined in 2 or 4, wherein the outer edge of each recess is formed upright in the direction of, or slightly slanted outwardly with respect to the direction of, the thickness of the raw strip, before the raw strip is bent to provide the bulged portion.

8. The method as defined in 1, 2, 3 or 4, wherein the lateral ends of the raw strip are pressed in the direction of its thickness, but in opposite directions, i.e., upwardly for one of the lateral ends and downwardly for the other lateral end, before the raw strip is bent to provide the bulged portion, whereby one of the thus chamfered or slanted ends becomes thinner from its lower edge towards its upper edge, while the other slanted end contrarily becomes thinner from its upper edge towards its lower edge, and both the slanted ends are covered with the brazing substance layer.

9. The method as defined in claim 1, 2, 3 or 4, wherein the bulged portion is formed such that the recesses are disposed outwardly of the bulged portion.

10. The method as defined in 1, 2, 3 or 4, wherein slits are punched at opposite side zones of the raw strip, before the raw strip is bent to provide the bulged portion, so that the slits can be coupled with one another to provide an integral opening in which a partition of the heat exchanger is inserted and secured later, whereby the coolant is caused to flow in a meandering manner within the heat exchanger.

11. The method as defined in 1, 2, 3 or 4, wherein cutouts are formed at opposite side zones of the raw strip, before the raw strip is bent to provide the bulged portion, so that the cutouts can be coupled with one another to provide a bore in which a coolant inlet or outlet pipe of the heat exchanger is inserted and secured later.

12. A method of making a brazeable metal pipe having a plurality of tube insertion apertures of an elliptical shape and also having guide lugs formed integral with and extending from at least one of the opposite peripheral edges defining therebetween the minor axis of the elliptical aperture, with the guide lugs extending in parallel with the direction of insertion of flat tubes into the aperture, the method comprising the steps of:
punching a raw strip to form raw unfinished apertures of a shape corresponding to the tube-insertion apertures in such a manner that opposite edges facing one another in the direction of the minor axis of the elliptical aperture remains unpunched to provide protrusions, the raw strip being a brazing sheet comprising a core sheet which has either or both surfaces covered with a brazing substance layer;
then bending a region of the raw strip transversely or longitudinally thereof so as to form a bulged portion arc-shaped in cross section and connected to at least one unbulged flat portions, with the bulged portion including the raw apertures;
thereafter bending the raw apertures so that the protrusions become the guide lugs; and
finally bending the at least one unbulged portions of the raw strip so that their side edges abut each other to form the cylindrical pipe.

13. A method of making a brazeable metal pipe having a plurality of tube insertion apertures of an elliptical shape and also having guide lugs formed integral with and extending from at least one of the opposite peripheral edges defining therebetween the minor axis of the elliptical aperture, with the guide lugs extending in parallel with the direction of insertion of flat tubes into the aperture, the method comprising the steps of:
preliminarily forming a plurality of raw strips by removing unnecessary portions from a brazing sheet comprising a core sheet which has either or both surfaces covered with a brazing substance layer, so that the raw strips are connected to each other by ears which extend from longitudinal or transverse opposite sides of said raw sheets and are integral with common outer supporting bands;
punching the raw strip or the brazing sheet to form raw unfinished apertures of a shape corresponding to the tube-insertion apertures in such a manner that opposite edges facing one another in the direction of the minor axis of the elliptical aperture remains unpunched to provide protrusions;

14. The method as defined in claim 12 or 13, wherein opposite arcuate edges located at ends of the major axis of the raw aperture are chamfered at their inner corners, before the raw strip is bent to form the bulged portion, so that tapered surfaces are provided which will become parallel with the flat tubes inserted in the apertures of the finished pipe, and wherein outer corners of the opposite arcuate edges provide upright surfaces which extend perpendicular to the raw strip and half a thickness thereof but will be slanted outwardly in the finished pipe.

15. The method as defined in claim 12 or 13, wherein the guide lugs are formed at both the opposite peripheral edges defining the minor axis of each tube-insertion aperture.

16. The method as defined in claim 12 or 13, wherein the lateral ends of the raw strip are pressed in the direction of its thickness, but in opposite directions, i.e., upwardly for one of the lateral ends and downwardly for the other lateral end, before the raw strip is bent to provide the bulged portion, whereby one of the thus chamfered or slanted ends becomes thinner from its lower edge towards its upper edge, while the other slanted end contrarily becomes thinner from its upper edge towards its lower edge, and both the slanted ends are covered with the brazing substance layer.

17. The method as defined in claim 12 or 13, wherein each protrusion is formed along an intermediate portion of the major axis of the unfinished aperture.

* * * * *

UNITED STATES PATENT AND TRADEMARK OFFICE
CERTIFICATE OF CORRECTION

PATENT NO. : 5,243,842
DATED : September 14, 1993
INVENTOR(S) : Kobayashi et al

It is certified that error appears in the above-identified patent and that said Letters Patent is hereby corrected as shown below:

At column 22, Claim 13, after line 22, the following should be inserted:

--then bending a region of the raw strip transversely or longitudinally thereof so as to form a bulged portion arc-shaped in cross section and connected to at least one unbulged flat portions, with the bulged portion including the raw apertures;

thereafter bending the raw apertures so that the protrusions become the guide lugs;

subsequently bending the at least one unbulged flat portions of the raw strip so that their side edges abut each other to form the cylindrical pipe;

UNITED STATES PATENT AND TRADEMARK OFFICE
CERTIFICATE OF CORRECTION

PATENT NO. : 5,243,842
DATED      : September 14, 1993
INVENTOR(S) : Kobayashi et al It is certified that error appears in the above-indentified patent and that said Letters Patent is hereby corrected as shown below:

and finally separating each pipe from the common supporting bands, wherein these steps are carried out continuously while the elongate brazing sheet is transported longitudinally.--

Signed and Sealed this

Third Day of May, 1994

*Attest:*

BRUCE LEHMAN

*Attesting Officer*     *Commissioner of Patents and Trademarks*